United States Patent
Fukumasa et al.

[11] Patent Number: 6,041,034
[45] Date of Patent: Mar. 21, 2000

[54] SPREAD SPECTRUM COMMUNICATION SYSTEM

[75] Inventors: Hidenobu Fukumasa; Yasuyuki Oishi; Kazuo Nagatani; Hajime Hamada, all of Kawasaki, Japan

[73] Assignee: Fujitsu Limited, Kanagawa, Japan

[21] Appl. No.: 08/940,479

[22] Filed: Sep. 30, 1997

[30] Foreign Application Priority Data

Dec. 20, 1996 [JP] Japan ................................. 8-342235

[51] Int. Cl.[7] ........................... H04B 7/216; H04B 7/212; H04B 1/38
[52] U.S. Cl. .......................... 370/203; 370/320; 370/342; 708/250; 708/253; 375/219
[58] Field of Search ................................. 370/203, 208, 370/209, 320, 335, 342, 206; 375/206, 207, 219, 220, 347, 349, 295, 316; 708/250, 252, 253, 314

[56] References Cited

U.S. PATENT DOCUMENTS

| 4,672,658 | 6/1987 | Kauehrad et al. | 370/342 |
|---|---|---|---|
| 5,103,459 | 4/1992 | Gilhousen et al. | 370/342 |
| 5,455,822 | 10/1995 | Dixon et al. | 370/342 |
| 5,737,324 | 4/1998 | Dixon et al. | 370/342 |
| 5,796,772 | 8/1998 | Smith et al. | 375/219 |
| 5,802,102 | 9/1998 | Davidivici | 708/314 |
| 5,815,525 | 9/1998 | Smith et al. | 375/295 |
| 5,887,020 | 3/1999 | Smith et al. | 375/219 |
| 5,926,500 | 7/1999 | Odenwalder et al. | 370/209 |
| 5,930,230 | 7/1999 | Odenwalder et al. | 370/342 |

OTHER PUBLICATIONS

Orthogonal Multi–Rate Forward Link Using Tree–Structured Generation Method of Orthogonal Spreading Codes for Coherent DS–CDMA; Okawa et al. Technical Report of IEICE. Nov. 1996.

Coherent Multicode DS–CDMA Mobile Radio Access for Next Generation System; Adachi et al. Technical Report of IEICE. Oct. 1995.

Dixon, R. C., "Spread Spectrum System" (John Wiley & Sons, Inc., 3rd ed. pp. 412–413, 1994.

Pursley M.S., "Performance Evaluation for Phase–codes Spread Spectrum Multiple–Access Communications—Part i: System Analysis" IEEE, Aug. 1977.

Mohsen et al, "Direct Dequence Spread Spectrum with DPSKModulation and Diversity for Indooe Wireless Communication" IEEE, Feb. 1987.

Dixon R.C. "Spread Spectrum Systems" 2nd ed., 1984.

*Primary Examiner*—Alpus H. Hsu
*Assistant Examiner*—Afsar M. Qureshi
*Attorney, Agent, or Firm*—Helfgott & Karas, PC.

[57] ABSTRACT

Co-channel interference may be prevented even if data having different transmission rates are concurrently multiplied to a same frequency band width with a different spreading factors. A method for generating code division multiple access data from data having different rates by a direct spread spectrum includes the steps of combining an orthogonal code and a reversed orthogonal code obtained by inverting the orthogonal code, for each of orthogonal code sequence structured by an m-sequence thereby to generate a first sequence of orthogonal codes, combing two of the orthogonal code for each of orthogonal code sequences structured by the m-sequence thereby to generate a second sequence of orthogonal codes, combining two of the reversed orthogonal code for each of orthogonal code sequences structured by the m-sequence thereby to generate a third sequence of orthogonal codes, and generating another orthogonal code having twice a code length of the orthogonal code from the first, second and third sequence of orthogonal codes; and multiplying the generated orthogonal code and a different m-sequence, together.

19 Claims, 11 Drawing Sheets

FIG. 7

| $C_0^{16}$ × | $C_0^{32}$ × | $C_0^{64}$ × | $C_0^{128}$ × |
|---|---|---|---|
| | | | $C_1^{128}$ ○ |
| | | $C_1^{64}$ × | $C_2^{128}$ × |
| | | | $C_3^{128}$ ○ |
| | $C_1^{32}$ × | $C_2^{64}$ × | $C_4^{128}$ × |
| | | | $C_5^{128}$ × |
| | | $C_3^{64}$ × | $C_6^{128}$ × |
| | | | $C_7^{128}$ × |

FIG. 8

| $C_0^{16}$ × | $C_0^{32}$ × | $C_0^{64}$ × | $C_0^{128}$ × |
|---|---|---|---|
| | | | $C_1^{128}$ × |
| | | $C_1^{64}$ ○ | $C_2^{128}$ ○ |
| | | | $C_3^{128}$ ○ |
| | $C_1^{32}$ × | $C_2^{64}$ ○ | $C_4^{128}$ ○ |
| | | | $C_5^{128}$ ○ |
| | | $C_3^{64}$ × | $C_6^{128}$ × |
| | | | $C_7^{128}$ × |

SPREAD SPECTRUM COMMUNICATION SYSTEM

BACKGROUND OF THE INVENTION

1. Field of the Invention

The present invention relates to a spread spectrum communication system for performing direct sequence code division multiple access to data having different symbol rates by a direct sequence spectrum spreading method. Especially, the present invention relates to a spread spectrum communication system by which it becomes possible to improve auto-correlation properties of code sequences, simplify initial synchronous capture characteristics and effectively allocate limited code resources.

2. Description of the Related Art

In recent years, according to increased demands for mobile communications, effective use of frequencies in mobile communications has become a major subject in developments. Then, Direct Sequence Code Division Multiple Access system employing a spread spectrum communication technique has been extensively investigated as a system for realizing efficient frequency allocation for practical use.

FIG. 9 is a principle diagram of direct sequence code division multiple access (CDMA) system employing a spread spectrum modulation technique. In FIG. 9, a specific code $C_i$ is multiplied to a digital signal $S_i$ of each channel on a sender SEND. If the frequency f and time t are respectively expressed in axises of an ordinate and an abscissa in FIG. 10, the frequencies are entirely spreaded through a band width. Because of that, all channel signal components may coexist, as shown in FIG. 10.

If the code $C_i$ used at the sender SEND is also multiplied to a receipt signal at a receiver REC, it is possible to extract only the original signal $S_i$.

A direct sequence code division multiple access (CDMA) system using the spread spectrum modulation technique may be applied to a mobile cellular radio communication system, in which a plurality of base stations are arranged per cell, and signals to be sent to a plurality of users may be orthogonaized by the use of orthogonal codes, so that co-channel interference can be reduced in communications between base stations and mobile stations.

For example, a first technique for making sound signals orthogonaized by utilizing Walsh sequences disclosed in the Japanese unexamined patent application No. HEI6-501349 tilted "System and Method for Generating Signal Waveforms in a CDMA Cellar Telephone System" and a second technique for making signals orthogonaized by the use of orthogonal Gold codes described in the technical report No. RCS 95-79 in The Institute of Electronics, Information and Communication Engineers, titled "Coherent Multicode DS-CDMA Mobile Radio Access For Next Generation System" have been proposed.

On the other hand, demands for multimedia communications have been increased where various kinds of data, such as video image data, text data, and computer programs as well as sound data are transmitted and received is required. The multimedia communications have features such that required data transmission rate or communication quality is different, as depends on a type of communication data.

Therefore, to fulfill such the demands for multimedia communications it is required to have a system for achieving different data transmission rates. The orthogonal coding methods described in the first and second techniques are effective, when data have a same transmission rate. However, it is impossible to transmit data having different transmission rates, as keeping the data orthognized.

Therefore, on communications between the base stations and the mobile stations, interference has been generated between data having different data transmission rates. It causes a deterioration of communication quality.

To overcome the shortage of the above-described techniques, a third method has been proposed, in which codes to orthogonize signals having different spreading factors may be obtained by generating spreading codes with the tree structured generation method, which is described later, and the third method is disclosed in the technical report No. RC-96-103 of the Institute of Electronics information and communication, titled "Orthogonal Multi-Rate Forward Link Using Tree-Structured Generation Method of Orthogonal Spreading Codes for Coherent DS-CDMA.

In the third technique, the spreading codes are generated with the tree-structured generation method by the use of orthogonal Gold code sequences. However, the codes are structured by repeating short period codes, for example, 16 chip codes. Therefore, there is a problem that abnormal correlation values are periodically generated as shown in FIG. 11. That causes bad auto-correlation properties and deterioration of synchronous acquisition properties.

SUMMARY OF THE INVENTION

Accordingly, it is an object of the present invention to propose a code structuring method for combining codes having long periods which is superior to auto-correlation properties, and the method is quite different from the above-described third technique, and to provide;

A spread spectrum communication system for preventing mutual interference even if data having different transmission rates are concurrently multiplied to a same frequency band width with a different spreading factors.

Further, it becomes apparent as explained later that a number of orthogonal codes is limited on code assignment in the tree-structured generation method of orthogonal spreading codes in the above-referenced third technique. Therefore, it is necessary to efficiently allocate spreading codes. More particularly, in a multimedia mobile communication system in which different data transmission rate is required, there is a possibility that transmission rates are required for backward channel is different from that for forward channel. Because of that, it is difficult to cope with the problem when the forward channel requires higher data transmission capacity.

In this way, in the code allocation proposed in the tree-structured generation method of orthogonal spreading codes in the third technique, only some specific reading codes are inclined to be used when the signals having different spreading factors coexist. Therefore, unusable codes remain in high speed data transmission, as it were a worm-eaten form. Accordingly, it has caused a problem that codes can not be efficiently used.

Accordingly, it is another object of the present invention to provide a spread spectrum communication system using spread spectrum, in which the spreading codes can be efficiently used to overcome the shortage of the conventional system.

further objects of the present invention will become clear by the following explanation of the embodiments employing the present invention in accompanying with the attached drawing.

BRIEF DESCRIPTION OF THE DRAWINGS

FIG. 7 is a first explanatory diagram of a third code assignment method according to the present invention.

FIG. 8 is a second explanatory diagram of a third code assignment method according to the present invention.

DETAILED DESCRIPTION OF THE PREFERRED EMBODIMENTS

Figure 1:
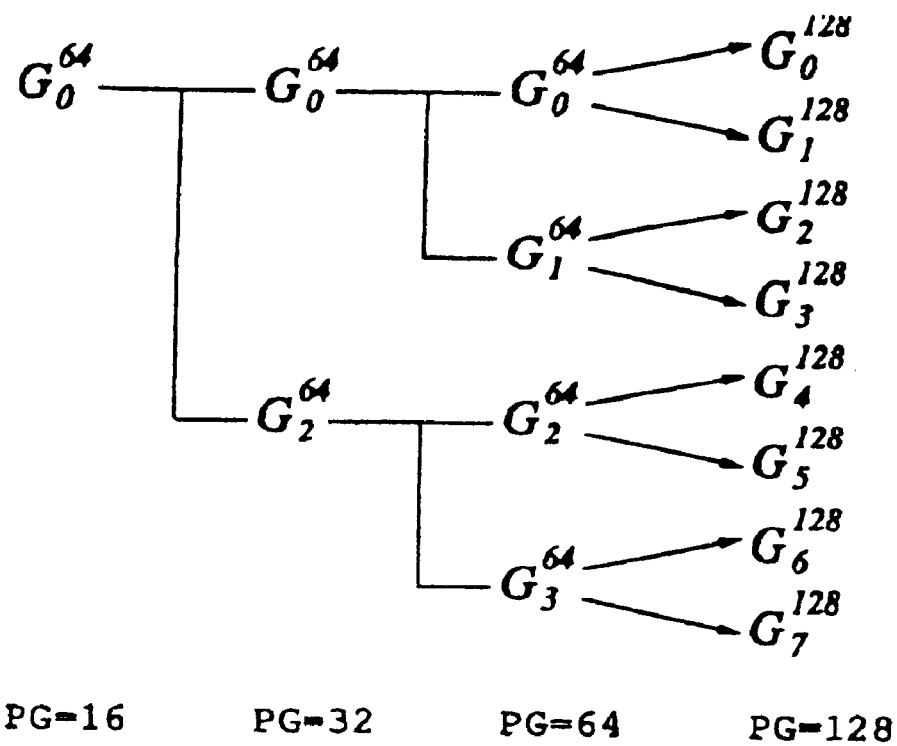
FIG. 1 shows one example of tree-structured spreading code System using an m-sequence according to the present invention.

Hereinafter, embodiments according to the present invention will be explained. Before explaining the embodiments, contents of the code structure in the third technique as described in the technical report No. RCS 96-103 of the Institute of Electronics, Information and Communication Engineers, titled "Orthogonal Multi-Rate Forward Link Using Tree-Structured Generation Method" are now explained to better understand the present invention.

In the tree-structured generation method of orthogonal spreading codes in the third technique, a code $C^{2N}$ of length $2N$ as expressed by the following equation 2 using a code $C^N$ of length $N=2^P$ expressed by the following equation 1 can be defined recursively as follows.

$$C^N = \{C_0^N, C_1^N, C_2^N, \ldots, C_{N-1}^N\} \quad (1)$$
$$C_0^N = \{C_0^N(0), C_0^N(1), C_0^N(2), \ldots, C_0^N(N-1)\}$$
$$C_1^N = \{C_1^N(0), C_1^N(1), C_1^N(2), \ldots, C_1^N(N-1)\}$$
$$\vdots$$
$$C_{N-1}^N = \{C_{N-1}^N(0), C_{N-1}^N(1), C_{N-1}^N(2), \ldots, C_{N-1}^N(N-1)\}$$

$$C_{2k}^{2N} = \{C_k^N(0), C_k^N(1), \ldots, \quad (2)$$
$$C^N 0_k(N-1), C_k^N(0), C_k^N(1), \ldots, C_k^N(N-1)\}$$
$$C_{2k+1}^{2N} = \{C_k^N(0), C_k^N(1), \ldots,$$
$$C_k^N(N-1), \overline{C_k^N(0)}, \overline{C_k^N(1)}, \ldots, \overline{C_k^N(N-1)}\}$$

The tree-structured generation method described above is well known as a standard generation method of orthogonal matrixes. In the method, one row of an orthogonal matrix is expressed as one code. For example, it is described in pp. 453 of "coding Theory" written by Miyagawa, Iwadare, and Imai, published by Shokoudo.

When starting with $C^1=\{1\}$ on $N=2^0=1$, a code sequence well-known as a Walsh sequence can be generated. The Walsh sequence is employed even in a standard cellular system of CDMA in the U.S. to make forward signals orthogonal (refer to "Mobile Station-Base Station Compatibility Standard for Dual-Mode Wide band width Spread Spectrum Cellular System" TIA/EIA/IS-95-A).

For example, if $C^{16}$ is considered as an orthogonal Gold code of length 16, a signal of which spreading factor is 16 or more can be orthogonized. However, the present applicants have realized problem such that peaks appear per 16 chips auto-correlation of codes in the tree-structured generation method.

That is, it is a problem that synchronous acquisition properties is deteriorated due to the auto-correlation property as explained. Therefore, the present invention is to propose a different code structure method to solve the problem and to provide a radio communication system, in which spreading the spectrum technique is employed obtain spreading codes by the code structure method.

Next, a first code structure method according to the present invention will be now explained. A code structure method used for a system supporting four different spreading factors, such as 16, 32, 64, and 128, will be explained as embodiments of the present invention. It is also possible to construct a system for supporting different spreading factors, such as double sizes of 16, 32, 64 and 128 with the same structure.

First, a M sequence of length 15 is generated. The sequence is expressed as $m^{15}$. The M sequence is well-known as a superior code in periodical auto-correlation. The generation method and features for the M sequence are described in "Spread Spectrum Communication System" written by Mitsuo Yokoyama, published by Scientific and Technical press in detail.

In this description, one of two M sequences, each having period 15, is employed as:

$$m^{15}=\{0,0,0,1,0,0,1,1,0,1,0,1,1,1,1\}.$$

The $m^{15}$ is shifted by one chip. Then, zero is added to the shifted sequence of length 16, as expressed by:

$$M_1^{16}, \ldots, M_{15}^{16} \quad (3)$$

Further, a sequence in which elements are all zeroes and of which the length is 16 is expressed by:

$$M_0^{16} \quad (4)$$

The ith chip element of the code sequence is given by:

$$M_k^{16}(i) \quad (5)$$

That is, the code sequence can be expressed by:

$$M_0^{16} = \{0,\ 0,\ 0,\ 0,\ 0,\ 0,\ 0,\ 0,\ 0,\ 0,\ 0,\ 0,\ 0,\ 0,\ 0,\ 0\} \quad (6)$$

-continued $M_1^{16} = \{0, 0, 0, 1, 0, 0, 1, 1, 0, 1, 0, 1, 1, 1, 1, 0\}$ $M_2^{16} = \{0, 0, 1, 0, 0, 1, 1, 0, 1, 0, 1, 1, 1, 1, 0, 0\}$ $M_3^{16} = \{0, 1, 0, 0, 1, 1, 0, 1, 0, 1, 1, 1, 1, 0, 0, 0\}$ $M_4^{16} = \{1, 0, 0, 1, 1, 0, 1, 0, 1, 1, 1, 1, 0, 0, 0, 0\}$ $M_5^{16} = \{0, 0, 1, 1, 0, 1, 0, 1, 1, 1, 1, 0, 0, 0, 1, 0\}$ $M_6^{16} = \{0, 1, 1, 0, 1, 0, 1, 1, 1, 1, 0, 0, 0, 1, 0, 0\}$ $M_7^{16} = \{1, 1, 0, 1, 0, 1, 1, 1, 1, 0, 0, 0, 1, 0, 0, 0\}$ $M_8^{16} = \{1, 0, 1, 0, 1, 1, 1, 1, 0, 0, 0, 1, 0, 0, 1, 0\}$ $M_9^{16} = \{0, 1, 0, 1, 1, 1, 1, 0, 0, 0, 1, 0, 0, 1, 1, 0\}$ $M_{10}^{16} = \{1, 0, 1, 1, 1, 1, 0, 0, 0, 1, 0, 0, 1, 1, 0, 0\}$ $M_{11}^{16} = \{0, 1, 1, 1, 1, 0, 0, 0, 1, 0, 0, 1, 1, 0, 1, 0\}$ $M_{12}^{16} = \{1, 1, 1, 1, 0, 0, 0, 1, 0, 0, 1, 1, 0, 1, 0, 0\}$ $M_{13}^{16} = \{1, 1, 1, 0, 0, 0, 1, 0, 0, 1, 1, 0, 1, 0, 1, 0\}$ $M_{14}^{16} = \{1, 1, 0, 0, 0, 1, 0, 0, 1, 1, 0, 1, 0, 1, 1, 0\}$ $M_{15}^{16} = \{1, 0, 0, 0, 1, 0, 0, 1, 1, 0, 1, 0, 1, 1, 1, 0\}$ According to this code sequence, codes of length 32 and 64 are generated by employing a tree-structured sequence code generation method similar to the above-described third technique as expressed by:

$$M_k^{32} \quad (7)$$

Then, a code of length 64 is generated similar to the code of length 32 as given by:

$$M_k^{64} \quad (8)$$

By multiplying orthogonal matrices of two rows and two columns, the length and number of the code respectively become double. This is a standard orthogonal matrix generation method. The matrix is given by:

$$\begin{pmatrix} 0 & 0 \\ 0 & 1 \end{pmatrix} \quad (9)$$

The obtained codes of length 64 as expressed by the expression 8 are respectively orthogonal. Further, there is kept an orthogonization for codes even having short length except codes having direct sequence relation.

Here, m is used to mean a sequence, of which period is 64, obtained by adding 1 chip to the M sequence of length 63. Additions of modulo 2 may be executed to m with all sequences expressed as expressions 10 and 11 in the same phase in order to generate new sequences.

$$M_0^{64} \quad (10)$$

$$M_{63}^{64} \quad (11)$$

The obtained new sequence is expressed by:

$$G_k^{64} \quad (12)$$

The expression 12 can be expressed as a standard equation as follows;

$$G_k^{64}(i) = m(i) + M_k^{64}(i) \qquad 0 \le k \le 63 \quad (13)$$

where +means an addition of modulo 2. However, the above-described elements of the code of expression 10 are all zeroes. Therefore, it is expressed as:

$$G_0^{64}(i) = m(i) \quad (14)$$

m is multiplied to all of the orthogonal codes expressed by the expression 8 with the same phase. The obtained code of expression 12 also becomes an orthogonal code. Further, it is possible to generate the orthogonal code of length 128 by multiplying the orthogonal matrix of two rows and two columns to the above-described expression 12.

In this case, it is different from codes generated by the tree-structured generation method of the spreading code in the above-described third technique that the above-described expression 12 is employed as an spreading code even if the spreading factor is 64 or less.

The code allocation is executed as shown in FIG. 1. When employing expression 15 with the spreading factor 32, other users can not concurrently use codes of expressions 15 and 16, and expressions 17 generated by the expressions 15 and 16, as follows:

$$G_2^{64} \quad (15)$$

$$G_3^{64} \quad (16)$$

$$G_4^{128} \sim G_7^{128} \quad (17)$$

Further, expression 18 can be also employed with the spreading factor 32, however, it can not be used with the spreading factor 16.

The expression 8 is expressed as:

$$G_0^{64} \quad (18)$$

A second code structure method according to the present invention will be now described. Auto-correlation properties can be also improved in this case. The code structure method of the spreading code according to the above-described third technique or the codes generated by the first code structure method employing the M sequence according to the present invention are applicable only to the case where the spreading factors, such as 16, 32, 64 and 128, are power of 2, not to the case where the factors are optional.

A structure using quadratic residue sequences will be explained as codes applicable to wide ranged spreading factors not restricted to the case where the spreading factor is power of two. This method can be applied to the case where the spreading factor is multiples of four.

In the generation method of quadratic residue sequence, when a (multiples of four—1) is a prime number, the quadratic residue sequence of the length of the prime number exists as described in pp. 455 and 480 of "Coding Theory" written by Miyagawa, Iwadare, Imai, published by Shokoudou.

{1,0,1,0,0,0,1,1,1,0,1} is a quadratic residue sequence of the period 11. The sequence is shifted by one chip. Then, zero is added to the end of the sequence of the length 12 as expressed by:

$$S_1^{12}, \ldots, S_{11}^{12} \quad (19)$$

Further, a sequence of which elements are all zeroes having the length 12 is expressed by a code of expression 20. Then, the ith element of each code sequence is expressed as a code of expression 21.

These codes are given by:

$$S_0^{12} \quad (20)$$

$$S_k^{12}(i) \quad (21)$$

where the code sequences are expressed as follows:

$$
\begin{aligned}
S_0^{12} &= \{0, 0, 0, 0, 0, 0, 0, 0, 0, 0, 0, 0\} \quad (22)\\
S_1^{12} &= \{1, 0, 1, 0, 0, 0, 1, 1, 1, 0, 1, 0\}\\
S_2^{12} &= \{1, 1, 0, 1, 0, 0, 0, 1, 1, 1, 0, 0\}\\
S_3^{12} &= \{0, 1, 1, 0, 1, 0, 0, 0, 1, 1, 1, 0\}\\
S_4^{12} &= \{1, 0, 1, 1, 0, 1, 0, 0, 0, 1, 1, 0\}\\
S_5^{12} &= \{1, 1, 0, 1, 1, 0, 1, 0, 0, 0, 1, 0\}\\
S_6^{12} &= \{1, 1, 1, 0, 1, 1, 0, 1, 0, 0, 0, 0\}\\
S_7^{12} &= \{0, 1, 1, 1, 0, 1, 1, 0, 1, 0, 0, 0\}\\
S_8^{12} &= \{0, 0, 1, 1, 1, 0, 1, 1, 0, 1, 0, 0\}\\
S_9^{12} &= \{0, 0, 0, 1, 1, 1, 0, 1, 1, 0, 1, 0\}\\
S_{10}^{12} &= \{1, 0, 0, 0, 1, 1, 1, 0, 1, 1, 0, 0\}\\
S_{11}^{12} &= \{0, 1, 0, 0, 0, 1, 1, 1, 0, 1, 1, 0\}
\end{aligned}
$$

When a (multiples of four-i) is not a prime number, it is possible to generate orthogonal codes of the length of the multiples of 4 by employing the method shown in pp.459 of "Coding Theory" written by Miyagawa, Iwadare, Imai, published by Shokodo. Therefore, it becomes possible to apply a procedure of the second embodiment.

The orthogonal codes of the lengths 24 and 48 can be generated similar to the case where the first code structure method of the first embodiment is employed. Here, m is set as a sequence, of which period is 48, generated by adding one chip to a quadratic residue sequence of the length 47. A new sequence can be generated by executing an addition of modulo 2 with the same phase for all sequences of codes 23 and 24. These codes are given by:

$$S_0^{48} \quad (23)$$

$$S_{47}^{48} \quad (24)$$

The newly generated sequence is expressed by:

$$G_k^{48} \quad (25)$$

That is, the sequence is expressed as the following equation:

$$G_k^{48}(i) = m(i) + S_k^{48}(i) \quad 0 \le k \ge 47 \quad (26)$$

where + means an addition of modulo 2. It is also possible to make a code having longer length by multiplying orthogonal matrix of two rows and two columns as required.

Figure 2:
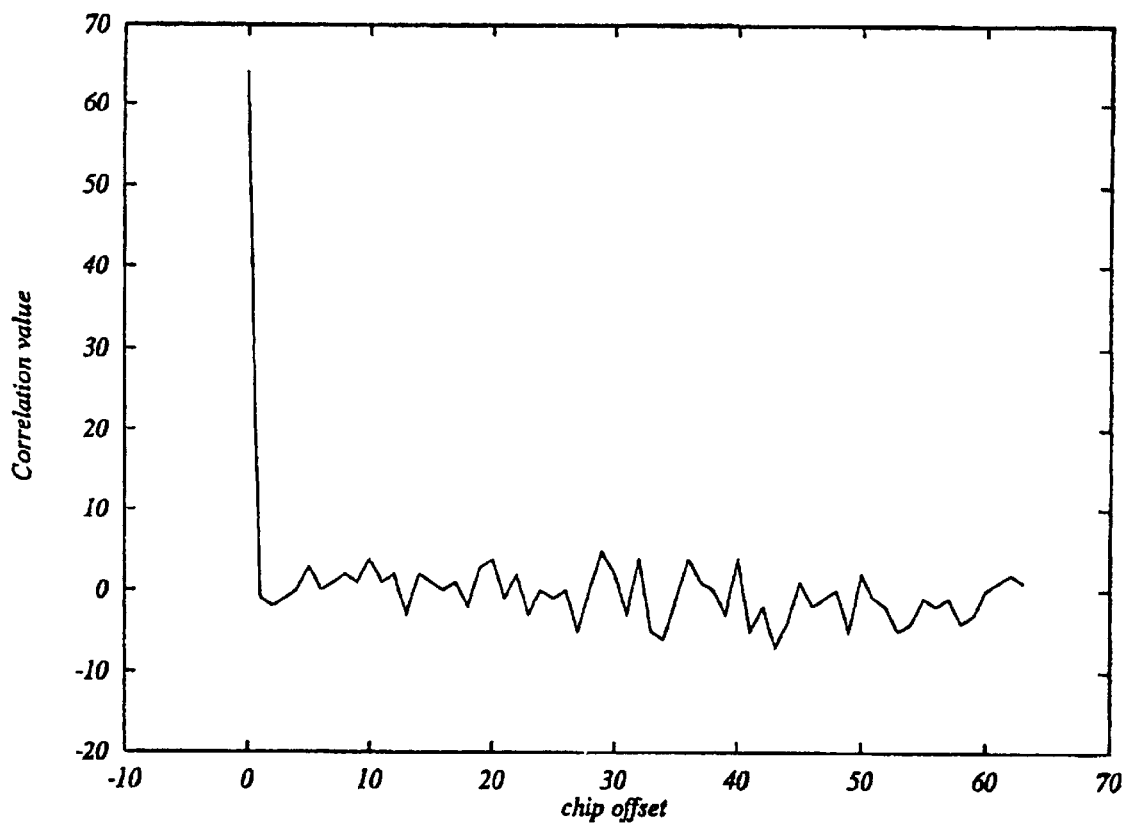
FIG. 2 is a diagram explaining improvement in auto-correlation properties of the tree-structured spreading codes using an m-sequence according to the present invention.

As described above, codes generated by the first and second code structure methods having orthogonization of long code length can be obtained in the first and second embodiments. Thereby, it becomes possible to improve the auto-correlation properties, which becomes a problem in the third technique, as shown in FIG. 2.

Here, it is possible to improve the auto-correlation properties which becomes a problem in the third technique in the first and second embodiments. However, there is a limitation of code assignment similar to the case of the third technique.

Therefore, an embodiment according to the present invention will be described later, in which more effective code allocation can be performed.

Figure 3A:
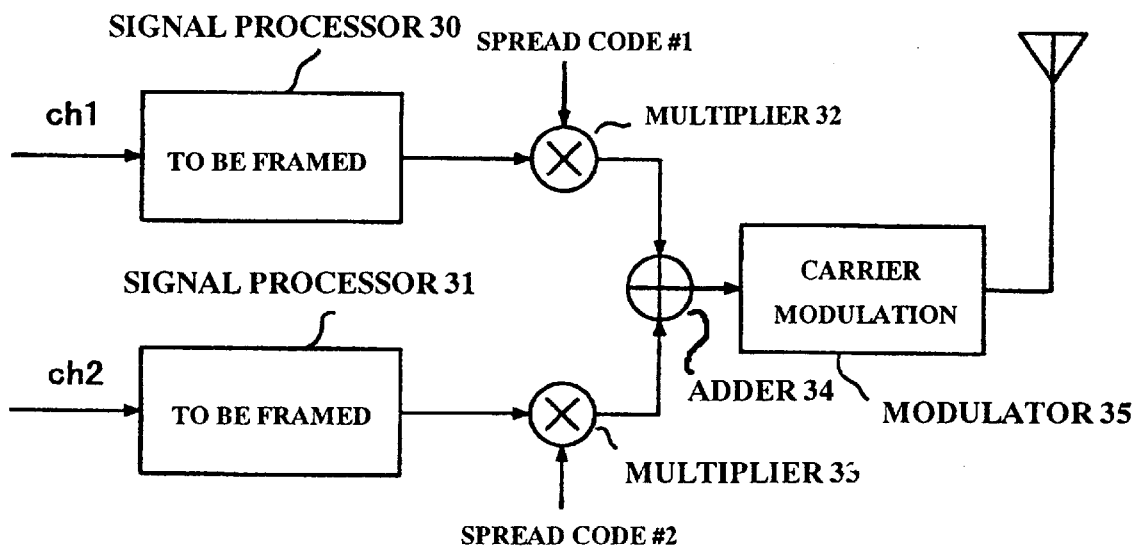
FIGS. 3A and 3B respectively illustrate example diagrams of a transmitter and a receiver of standard CDMA cellular communication system.
Figure 3B:
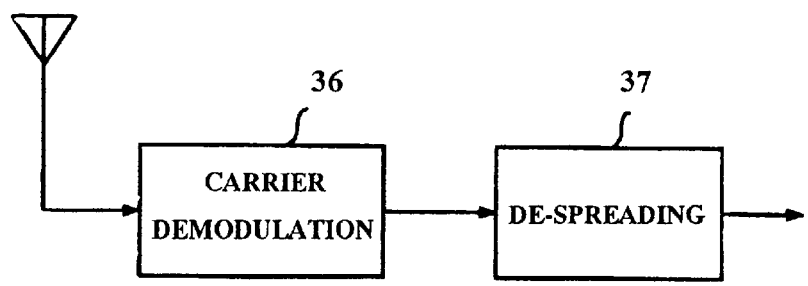

FIGS. 3A and 3B show diagrams of an example of a standard CDMA cellular communication system. FIG. 3A shows a functional block diagram of a base station BS. FIG. 3B shows a functional block diagram of a mobile station MS. Further, FIG. 4 shows a flow chart for explaining spreading code assignment between the base station BS and the mobile station MS.

Figure 4:
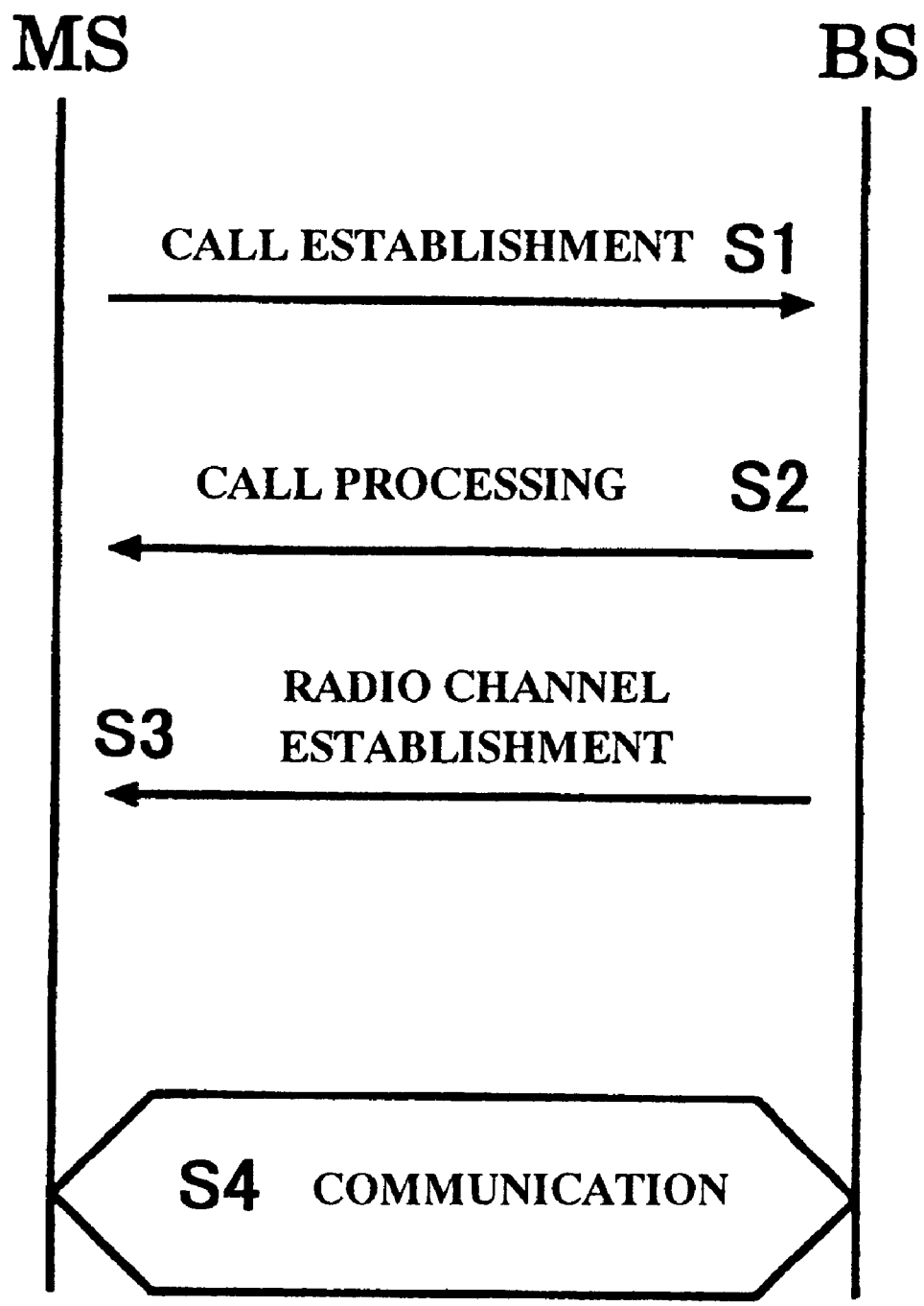
FIG. 4 shows a flow chart for explaining spreading code assignment between a base station BS and a mobile station MS on a mobile radio system.

At first, the mobile station MS requests call establishment to the base station BS (refer to FIG. 4: STEP S1). Then, the call establishment is performed with specifying a data transmission rate for facilitating communications. The base station BS confirms whether or not the mobile station MS can receive a call establish request to the mobile station MS (STEP S2). Next, the base station BS replies to the mobile station MS, data, such as spreading code assignment for facilitating communications, by specifying radio channels (STEP S3).

The mobile station MS can acknowledge, by which spreading code the data from the base station BS is transmitted, based on the transmitted data. Therefore, the mobile station MS can ready for facilitating communications with the base station BS (STEP S4).

In FIG. 3A, the mobile station MS generates signals framed in signal processors 30 and 31 per channels. Then, the station MS may obtain an EX-OR logic with fixed spreading codes #1 and #2 specified from the base station BS per channels in multipliers 32 and 33.

An adder 34 adds an EX-OR logic outputted from the multipliers 32 and 33 required for all channels. Then, a modulator 35 modulates carrier waves with the output signal for transmitting to the base station BS.

In FIG. 3B, the base station BS demodulates the signals in a carrier demodulator 36. Then, an inverse spreading circuit 37 performs an addition of modulo 2 with the same spreading codes as that of the mobile station in correspondence to channels. Therefore, it is possible to receive and reproduce transmitted signals per channels.

In here, when spreading codes are assigned from the base station BS to the mobile station MS shown in the above-described flow chart of FIG. 4, codes generated by the tree-structured generation method of spreading codes according to the third technique or codes generated by the first and second code structure methods according to the first and second embodiments of the present invention are employed. In this case, it is required to take the spreading codes to be assigned into a consideration.

Figure 5:
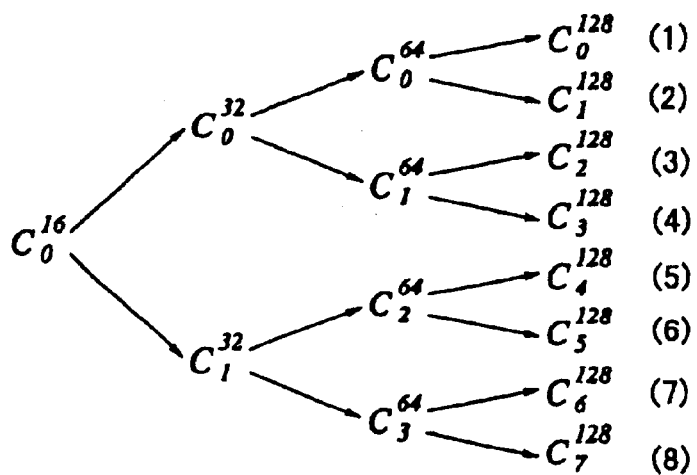
FIG. 5 shows one example of the tree-structured spreading codes.

For example, the codes generated in the tree-structured generation method of the spreading code are involved in the tree-structured sequence as shown in FIG. 5. Therefore, if direct sequences are concurrently employed, an orthogonal relationship can not be kept, thus causing large interference. Further, FIG. 5 shows only the tree-structured formations of four sets of spreading codes selected from sixty-four sets of codes of which the spreading factors are 128.

When the codes structured with the tree-structured generation method of the spreading codes in the third technique or the codes structured with the first and second code structure methods of the first and second embodiment are employed, it is, accordingly, required to assign the codes within the limitations described above. If signals having a various kinds of spreading factors coexist, there is, therefore, a possibility that the codes can not be effectively assigned.

Accordingly, the present invention provides an effective code assignment method in a system for supporting different spreading factors, which will be now described.

At first, a first code allocation method according to the present invention will be now explained, in the case that four spreading factors 16, 32, 64 and 128 are supported by the system, and the codes generated with the tree-structured code generation method or the first and second code structure methods of the first and second embodiment are employed.

Where the spreading factor requested from the mobile station MS is 128:

(STEP 1): where k is set as zero.

(STEP 2): Here, it is judged whether or not a code of expression 27 is usable and a code of expression 28 is unusable (STEP 2). These code are given as follows:

$$C_{2k}^{128} \tag{27}$$

$$C_{2k+1}^{128} \tag{28}$$

When the code of expression 27 is usable and the code of expression 28 is unusable, the processing is finished by assigning the code of expression 27.

When the code of expression 27 is not usable and the code of expression 28 is usable, the processing proceeds to the next step 3.

The above processing of the steps 1 and 2 means that for example, (1) (see the code of expression 29) and (2) (see the code of expression 30) of the first set of the spreading factor 128 are considered in FIG. 5, it is judged whether or not 1 is usable and 2 is unusable, and then (1) will be allocated if it is usable.

$$C_0^{128} \tag{29}$$

$$C_1^{128} \tag{30}$$

(STEP 3): It is judged whether or not the code of 1expression 27 is unusable and the code of expression 28 is usable.

When the code of expression 27 is unusable and the code of expression 28 is usable, the processing is finished by assigning the code of expression 28.

When the code of expression 27 is usable and the code of expression 28 is not usable, the processing proceeds to the next step 4.

For example, (1) (the above-described code of expression 29) and (2) (the above-described code of expression 30) of the first set shown in FIG. 5 are again considered. When it is judged whether or not (1) is unusable and (2) is usable, (2) is assigned, if (2) is usable.

(STEP 4): If k is 63, the processing proceeds to the next step 5.

When k is not 63, k is set as k+1. Then, the processing proceeds to the step 2 to repeat until coming to k=63.

When only one code of a certain pair within 64 pairs of codes having spreading factor 128 is used on the procedures of the steps 1 to 4, and the other code of the certain pair is not usable, the procedures of the steps 1 to 4 are to assign a code so as to use the other code of the certain pair:

(STEP 5): k is set as zero.

(STEP 6): It is judged whether or not the code of expression 31 is usable.

$$C_k^{128} \tag{31}$$

When a code of expression 31 is usable, the processing is finished by assigning the code of expression 31.

When the code of expression 31 is not usable, the processing proceeds to the next step 7.

(STEP 7): If k is 127, the processing is finished because the code of expression 31 can not be assigned.

If k is not 127, the procedure is returned to the step 6 to repeat the processing.

The procedures of the above-described steps 5 to 7 are executed when both the two codes of a certain pair within the 64 pairs of codes having the spreading factors 128 are unusable.

When the requested spreading factor is 64:

(STEP 1): where k is set as zero.

(STEP 2): When a code of expression 32 is usable and a code of expression 33 is unusable;

$$C_{2k}^{64} \tag{32}$$

$$C_{2k+1}^{64} \tag{33}$$

the processing is finished by assigning the code of expression 32, otherwise the processing proceeds to the next step 3.

(STEP S3): It is judged whether or not the code of expression 32 is unusable and the code of expression 33 is usable.

When the code of expression 32 is unusable and the code of expression 33 is usable, the processing is finished by assigning the code of expression 33.

When the code of expression 32 is usable and the code of expression 33 is not usable, the procedure proceeds to a step 4.

(STEP 4): If k is 31, the processing proceeds to the next step 5.

If k is not 31, k is set as k+1. Then, the processing is returned to the step 2 to repeat the processing.

The above-described processing is similar to procedures of the steps 1 to 4 when the spreading factor of the code is 128.

(STEP 5): Further, k is set as zero.

(STEP 6): It is judged where or not a code of expression 34 is usable.

$$C_k^{64} \tag{34}$$

When the code of expression 34 is usable, the processing is finished by assigning the code of expression 34.

When the code of expression 34 is not usable, the processing proceeds to the next step 7.

(STEP 7): It is judged whether or not k is 63. If k is 63, the processing is finished because the code of expression 34 can not be assigned.

If k is not 63, k is set as k+1. Then, the processing is returned to the step 6 to repeat the processing.

Further, the above-described processing is similar to the procedures of the steps 5 to 7 when the spreading factor of the code is 128.

When the required spreading factor is 32:
(STEP 1): k is set as zero.
(STEP 2): It is judged whether or not a code of expression 35 is usable and a code of expression 36 is unusable.

$$C_{2k}^{32} \quad (35)$$

$$C_{2k+1}^{32} \quad (36)$$

When the code of expression 35 is usable and the code of expression 36 is unusable, the processing is finished by assigning the code of expression 35.

When the code of expression 35 is not usable and the code of expression 36 is usable, the processing proceeds to the next step 3.

(STEP 3): It is judged whether or not the code of expression 35 is unusable and the code of expression 36 is usable.

When the code of expression 35 is unusable and the code of expression 36 is usable, the processing is finished by assigning the code of expression 36 as a code.

When the code of expression 35 is usable and the code of expression 36 is not usable, the processing proceeds to the next step 4.

(STEP 4): If k is 15, the processing proceeds to the next step 5.

If k is not 15, k is set as K+1. Then, the processing is returned to the step 2 to repeat the processing.

This processing is also the same as the procedures of the steps 1 to 4 when the spreading factor is 128 or 64.

(STEP 5): k is set as zero.
(STEP 6): It is judged whether or not a code of expression 37 is usable.

$$C_k^{32} \quad (37)$$

When the code of expression 37 is usable, the processing is finished by assigning the code of expression 37.

When the code of expression 37 is not usable, the processing proceeds to the step 7.

(STEP 7): If k is 31, the processing is finished because the code of expression can not be assigned.

If k is not 31, k is set as k+1. Then, the processing is returned to the step 6 to repeat the processing.

The processing is also the same as the procedures of the steps 5 to 7 when the spreading factor of the code is 128 or 64.

When the requested spreading factor is 16:
(STEP 1): where k is set as zero.
(STEP 2): Then, it is judged whether or not a code of expression 38 is usable.

$$C_k^{16} \quad (38)$$

When the code of expression 38 is usable, the processing is finished by assigning the code of expression 38 as a code.

When the code of expression 38 is not usable, the processing proceeds to the next step 3.

(STEP 3): If k is 15, the processing is finished because the code of expression 38 is not assigned.

If k is not 15, k is set as k+1. Then, the processing is returned to the step 2 to repeat the processing.

On the processing of the case where the spreading factor is 16, the structure includes no codes to be paired. Therefore, the processing is similar to the procedures of the steps 5 to 7 when the spreading factor is 128, 64, or 32, described above.

Next, a second code assignment method according to the present invention will be explained when the spreading factor supported by a system is 16, 32, 64 and 128, and the codes generated by the tree-structured code generation method or the codes generated by the first and second code structure methods according to the first and second embodiment are employed.

The second code assignment method is different from the first code assignment method of the spreading codes. The different point is to make new code assignment possible by re-assigning the codes to be in use even if the codes generated by the first code assignment method can not be assigned.

Figure 6:
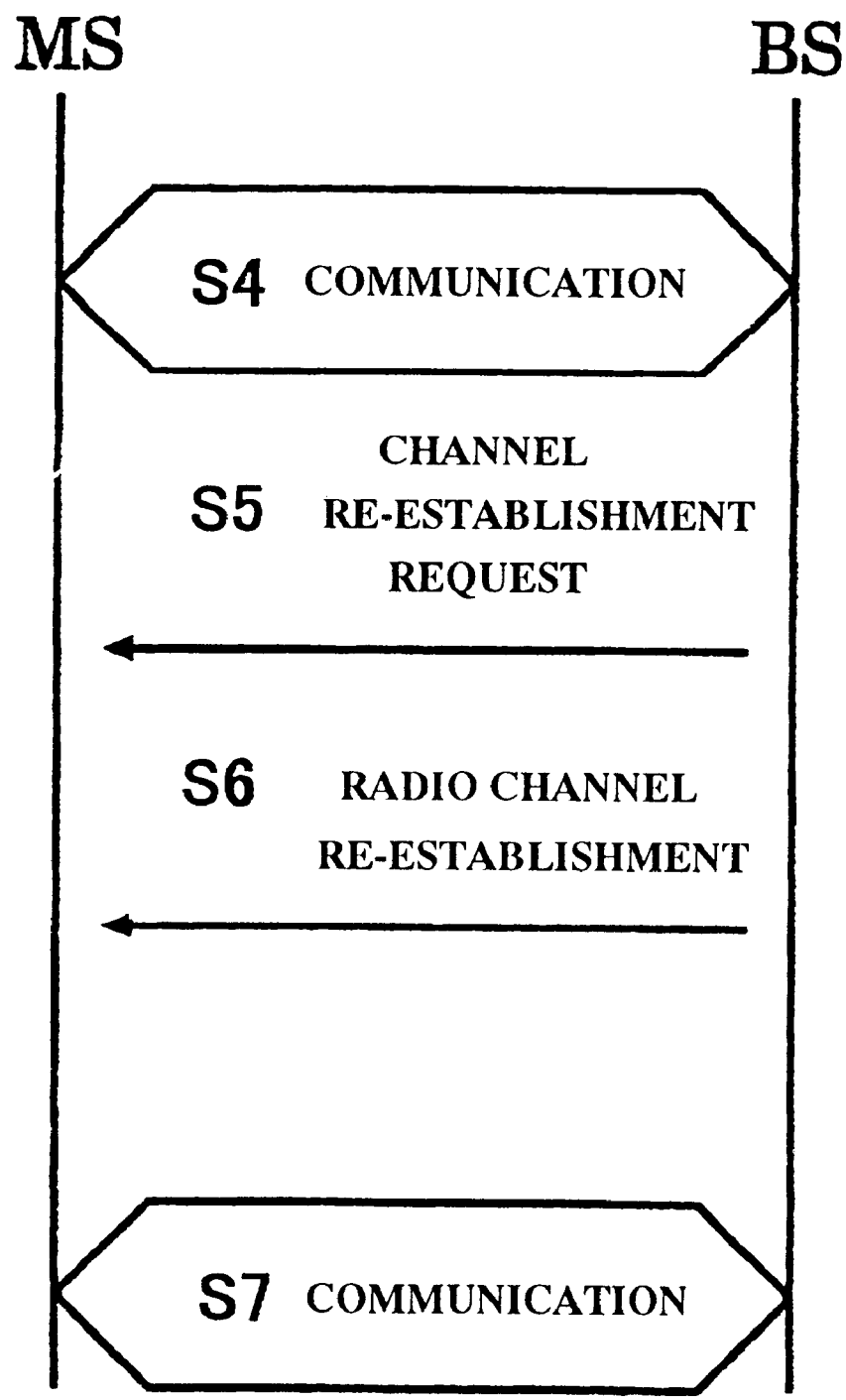
FIG. 6 is a diagram illustrating an outline of an operational flow chart of procedure of re-establishing spreading codes.
Figure 9:
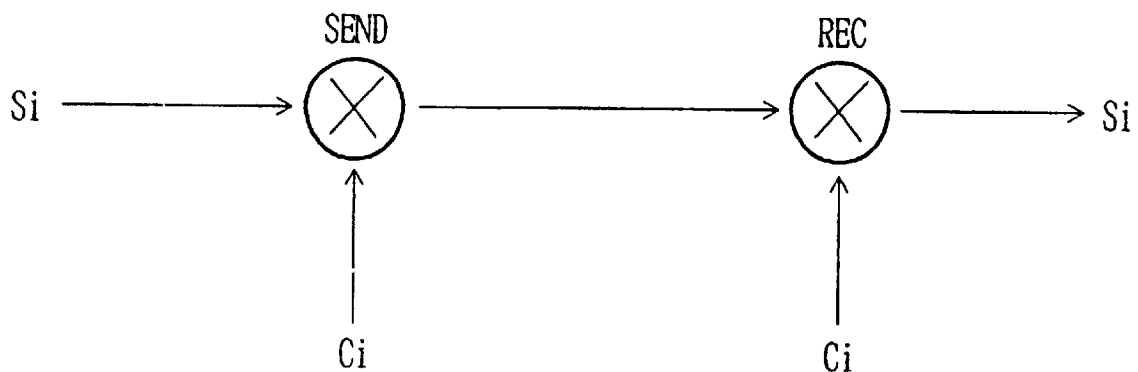
FIG. 9 is a principle diagram of code division multiple access (CDMA) system using a spread spectrum modulation method.
Figure 10:
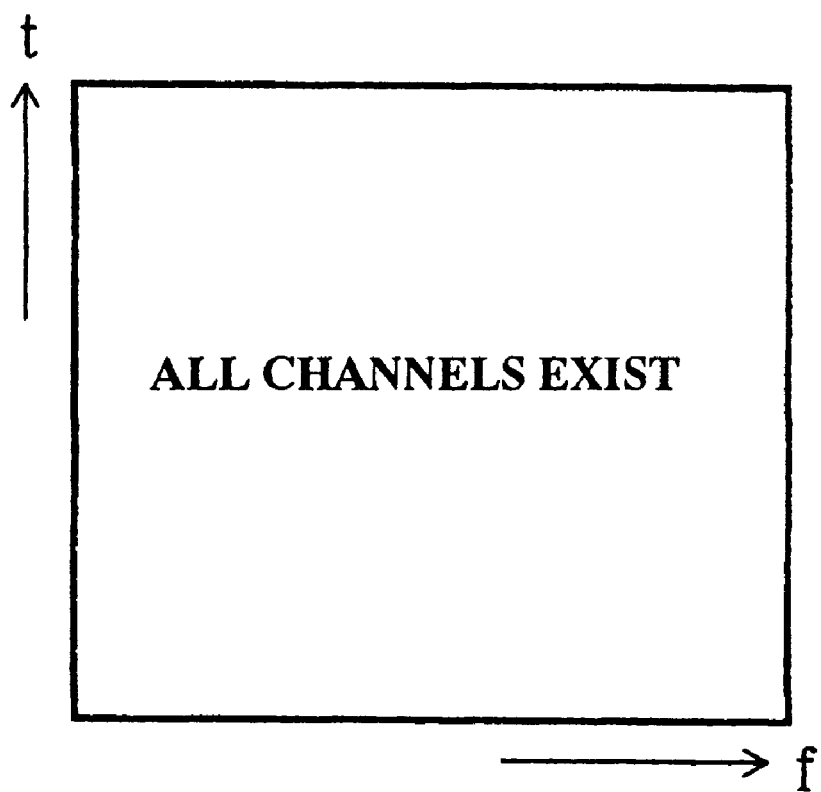
FIG. 10 is an explanatory diagram of spread spectrum of sending signals employing a spread spectrum technique.
Figure 11:
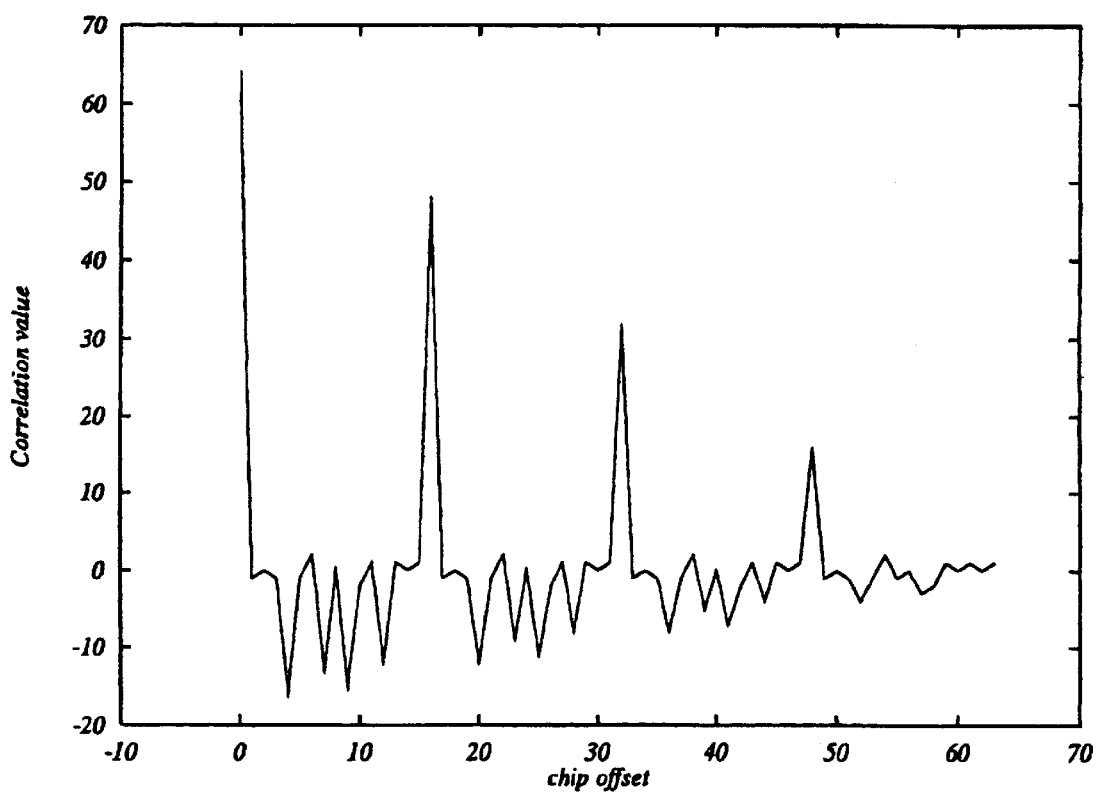
FIG. 11 shows an auto-correlation property on the conventional tree-structured generation method of spreading code.

For example, a procedure of reestablishment of the spreading codes is executed as an operational flow chart shown in FIG. 6. While facilitating communications between the base station BS and the mobile station MS (STEP S4), the base station BS requests the mobile station MS to modify the spreading codes of a forward link (STEP S5).

(STEP S6): Then, the station BS informs the newly assigned spreading code. (STEP S7): After that, the station BS facilitates communications by the use of new codes.

Reassignment of the codes to be in use in the above-described case will now be explained later.

When the requested spreading factor is 128:
where the assignment processing is similar to that in the first code assignment method.

When the requested spreading factor is 64:
(STEP 1): k is set as zero.
(STEP 2): Then, it is judged whether or not a code of expression 39 is usable and a code of expression 40 is unusable.

$$C_{2k}^{64} \quad (39)$$

$$C_{2k+1}^{64} \quad (40)$$

When the code of expression 39 is usable and the code of expression 40 is unusable, the processing is finished by assigning the code of expression 39 as a code.

When the code of expression 39 is not usable and the code of expression 40 is usable, the processing proceeds to the next step 3.

(STEP 3): It is judged whether or not the code of expression 39 is unusable and the code of expression 40 is usable.

When the code of expression 39 is unusable and the code of expression 40 is usable, the processing is finished by assigning the code of expression 40.

When the code of expression 39 is usable and the code of expression 40 is unusable, the processing proceeds to the next step 4.

(STEP 4): If k is 31, the processing proceeds to the step 5.

If k is not 31, k is set as k+1. The processing is returned to the step 2 to repeat the processing.

(STEP 5): k is zero.
(STEP 6): It is judged whether or not a code of expression 41 is usable.

$$C_k^{64} \quad (41)$$

When the code of expression 41 is usable, the processing is finished by assigning the code of expression 41.

When the code of expression 41 is not usable, the processing proceeds to the next step 7.

(STEP 7): If k is 63, the processing proceeds to the next step 8.

If k is not 63, k is set as k+1. The processing is returned to the step 6 to repeat the processing.

(STEP 8): k and u are set as zero.

(STEP 9): It is judged whether or not a code of expression 42 is usable.

$$C_k^{128} \quad (42)$$

When the code of expression 42 is set as usable, m[u] is k, and u is set as u+1.

Then, it is judged whether or not u is 2.

If u is 2, the processing is passed to the step 11.

If u is not 2, the processing proceeds to the next step 10.

(STEP 10): If k is 127, the procedure is finished because the code can not be assigned.

If k is not 127, k is set as k+1. Then, the processing is returned to the step 9 to repeat the processing.

(STEP 11): When m[1] is an even number, the codes of users using a code of expression 43 is re-assigned to a code of expression 44. Then, a code of expression 45 is allocated to new users.

$$C_{m[1]+1}^{128} \quad (43)$$

$$C_{m[0]}^{128} \quad (44)$$

$$C_{m[1]/2}^{64} \quad (45)$$

When the m[1] is an odd number, the codes of the users using a code of expression 46 is re-assigned to the code of expression 44. A code of expression 47 will be assigned to a new user, and then the processing is finished.

$$C_{m[1]-1}^{128} \quad (46)$$

$$C_{(m[1]-1)/2}^{64} \quad (47)$$

The processing of the above-described steps 8 to 11 is summarized as that when two pairs of codes are considered, and where only one code of respective one of the two pairs is used, the one used code of one pairs is reassigned to the other code, which is not used, of the other pair. Therefore, the both codes of the one pair become unused, so that the unused codes of the one pair may be assigned to a higher ranked pair of codes.

When the requested spreading factor is 32:

(STEP 1): k is set as zero.

(STEP 2): Then, it is judged whether or not a code of expression 48 is usable and a code of expression 49 is unusable.

$$C_{2k}^{32} \quad (48)$$

$$C_{2k+1}^{32} \quad (49)$$

When the code of expression 48 is usable and the code of expression 49 is unusable, the processing is finished by assigning the code of expression 48.

When the code of expression 48 is not usable and the code of expression 49 is usable, the processing proceeds to the next step 3.

(STEP 3): Then, it is judged whether or not the code of expression 48 is unusable and the code of expression 49 is usable.

When the code of expression 48 is unusable and the code of expression 49 is usable, the procedure is finished by assigning the code of expression 49.

When the code of expression 48 is usable and the code of expression 49 is not usable, the procedure proceeds to the next step 4.

(STEP 4): If k is 15, the processing proceeds to the next step 5.

If k is not 15, k is set as k+1. Then, the processing is returned to the step 2 to repeat the processing.

(STEP 5): k is set as zero.

(STEP 6): Then, it is judged whether or not a code of expression 50 is usable.

$$C_k^{32} \quad (50)$$

When the code of expression 50 is usable, the processing is finished by assigning the code of expression 50.

When the code of expression 50 is not usable, k is set as k+1. Then, the processing proceeds to the next step 7.

(STEP 7): If k is 31, the processing proceeds to the next step 8.

If k is not 31, the processing is returned to the next step 6 to repeat the processing.

(STEP 8): k and u are respectively set as zero.

(STEP 9): Then, it is judged whether or not a code of expression 51 is usable.

$$C_{2k}^{128} \quad (51)$$

When the code of expression 51 is usable, m[u] is set as k, u is u+1. Then, it is judged whether or not u is 4. If u is 4, the processing proceeds to the step 11.

If u is not 4, the processing proceeds to the next step 10.

(STEP 10): If k is 127, the processing is finished because the code of expression 51 can not be assigned.

If k is not 127, k is set as k+1. Then, the processing is returned to the step 9 to repeat the processing. Reassignment of the codes is executed similar to the case where the spreading factor is 64 to make the code of the spreading factor 32 usable. Then, the processing is finished by assigning the usable code.

The processing of the above-described steps 8 to 11 is similar to the procedures of the steps 8 to 11 when the requested spreading factor is 64.

When the requested spreading factor is 16:

(STEP 1): k is zero.

(STEP 2): Then, it is judged whether or not a code of expression 52 is usable.

$$C_k^{16} \quad (52)$$

When the code of expression 52 is usable, the processing is finished by assigning the code of expression 52.

When the code of expression 52 is not usable, the processing proceeds to the next step 3.

(STEP 3): If k is 15, the processing proceeds to the next step 4.

If k is not 15, k is set as k+1. Then, the processing is returned to the step 2 to repeat the processing.

(STEP 4): k and u are respectively set as zero.

(STEP 5): Then, it is judged whether or not a code of expression 53 is usable.

$$C_k^{128} \quad (53)$$

When the code of expression 53 is usable, m[u] is set as k, and u is set as u+1.

If u is 8, the processing proceeds to the step 7.

If u is not 8, the processing proceeds to the step 6.

(STEP 6): If k is 127, the processing is finished because the code of expression 53 can not be assigned.

If k is not 127, k is set as k+1, the processing is returned to the step 5 to repeat the processing.

Reassignment of the code is executed to make the code of the spreading factor 16 usable as the same as the case where the spreading factor is 64. Then, the processing is finished by assigning the re-assigned code.

Next, a third code assignment method 3 according to the present invention will be now explained when the supported spreading factors are 16, 32, 64, and 128 and codes generated by the tree-structured code generation method are employed.

Simultaneously, the codes generated by the first and second code structure methods can be also assigned by the use of the third method 3.

It is different from the first and second code assignment methods 1 and 2 to make code assignment for new users possible without changing the positions of the already assigned codes in the case where the code can not be assigned in the first assignment method for spreading codes or the case where the code reassignment should be performed in the second assignment method for spreading codes.

At first, a principle of the third code assignment method will be now explained.

When the spreading factor is twofold larger, a code of expression 55 can be expressed as a code generated from a code of expression 54.

These codes of expressions are expressed as follows:

$$C_0^{16} \quad (54)$$

$$C_0^{128} \sim C_7^{128} \quad (55)$$

-continued $$C_0^{128} = C_0^{16}, C_0^{16}, C_0^{16}, C_0^{16}, C_0^{16}, C_0^{16}, C_0^{16}, C_0^{16} \quad (56)$$
$$C_1^{128} = C_0^{16}, C_0^{16}, C_0^{16}, C_0^{16}, \overline{C_0^{16}}, \overline{C_0^{16}}, \overline{C_0^{16}}, \overline{C_0^{16}}$$
$$C_2^{128} = C_0^{16}, C_0^{16}, \overline{C_0^{16}}, \overline{C_0^{16}}, C_0^{16}, C_0^{16}, \overline{C_0^{16}}, \overline{C_0^{16}}$$
$$C_3^{128} = C_0^{16}, C_0^{16}, \overline{C_0^{16}}, \overline{C_0^{16}}, \overline{C_0^{16}}, \overline{C_0^{16}}, C_0^{16}, C_0^{16}$$
$$C_4^{128} = C_0^{16}, \overline{C_0^{16}}, C_0^{16}, \overline{C_0^{16}}, C_0^{16}, \overline{C_0^{16}}, C_0^{16}, \overline{C_0^{16}}$$
$$C_5^{128} = C_0^{16}, \overline{C_0^{16}}, C_0^{16}, \overline{C_0^{16}}, \overline{C_0^{16}}, C_0^{16}, \overline{C_0^{16}}, C_0^{16}$$
$$C_6^{128} = C_0^{16}, \overline{C_0^{16}}, \overline{C_0^{16}}, C_0^{16}, C_0^{16}, \overline{C_0^{16}}, \overline{C_0^{16}}, C_0^{16}$$
$$C_7^{128} = C_0^{16}, \overline{C_0^{16}}, \overline{C_0^{16}}, C_0^{16}, \overline{C_0^{16}}, C_0^{16}, C_0^{16}, \overline{C_0^{16}}$$

When the following code of expressions 57, 58 and 59 are involved in the above-described codes:

$$C_0^{128} \quad (57)$$

$$C_2^{128} \quad (58)$$

$$C_1^{32} \quad (59)$$

only codes generated by the tree-structured code generation method that marked with circles in a table of FIG. 7 can be used. The codes of the spreading factor 64 can not be assigned.

In this case, after the connection request is rejected or the codes of the spreading factor 128 of the users who facilitate communications are modified to a code of expression 60 by using the above-described code of expression 58, communications should be facilitated with the use of a code of expression 61.

$$C_1^{128} \quad (60)$$

$$C_1^{64} \quad (61)$$

However, it is possible to facilitate communications of the spreading factor 64 by employing the third code assignment method without modifying the code assignment.

The above-described code of expression 60 and the following code of expression 62 can be expressed as sequences 63. The code of expressions 60 and 62 can be expressed with arranging the following code of expression 64 and the inverse bits of the code of expression 64.

$$C_3^{128} \quad (62)$$

$$C_1^{128} = C_0^{16}, \overline{C_0^{16}}, C_0^{16}, \overline{C_0^{16}}, C_0^{16}, \overline{C_0^{16}}, C_0^{16}, \overline{C_0^{16}} \quad (63)$$
$$C_3^{128} = C_0^{16}, \overline{C_0^{16}}, \overline{C_0^{16}}, C_0^{16}, C_0^{16}, \overline{C_0^{16}}, \overline{C_0^{16}}, C_0^{16}$$

$$C_0^{16} \quad (64)$$

When the codes $C_1^{64}$ and $C_3^{128}$ of expression 63 are compared, it is apparent that the first, second, fifth, and sixth $C_0^{16}$ are the same, and the third, fourth, seventh, and eighth bits are respectively reversed. That is, if one bit of two bit data is assigned to the first, second, fifth and sixth bits of the code of expression 64, and another bit is assigned to the third, fourth, seventh and eighth bits of the code of the expression 64,, communications can be facilitated with the 64-fold spreading by the use of the above-described code of expressions 60 and 62.

That can be realized by employing optional two codes. Therefore, it becomes possible to efficiently allocate the spreading codes without reassignment of the codes.

The above-described principle can be expressed in the following standard form. It is necessary to transmit two symbols by employing sequences having the length 128 in order to be 64-fold spreading. Two symbols of the data are expressed as d0 and d1. Further, a signal to be generated is shown as s(i).

(STEP 1): Then, it is judged whether or not two or more code of expressions 65 are idle.

$$C_k^{128} \tag{65}$$

When two or more codes having expression 65 are idle, the processing proceeds to the next step 2.

When two or more codes having expression 65 are not idle, the processing is finished because the code of expression 65 can not be assigned.

(STEP 2): Then, it is judged whether or not an usable set of code of expressions 66 and 67 coexist.

$$C_{2k}^{128} \tag{66}$$

$$C_{2k+1}^{128} \tag{67}$$

When an usable pair of the codes of expression 66 and 67 coexist, the following code of expression 68 is employed.

$$C_k^{64} \tag{68}$$

Accordingly, the code sequence to be transmitted is given by:

$$s(i) = \begin{cases} d_0 C_k^{64}(i) & 0 \leq i < 64 \\ d_1 C_k^{64}(i-64) & 4 \leq i < 128 \end{cases} \tag{69}$$

When there is no pair of the codes of expression 66 and 67, the procedure proceeds to the next step 3.

(STEP 3): A set of optional code of expressions 70 and 71 is employed. The obtained value on addition of modulo 2 per bits of two sequences is modulated to d0 at the position of "0", and modulates d1 at the position of "1". Accordingly, it becomes a signal sequence including the following equation 72.

$$C_{k1}^{128} \tag{70}$$

$$C_{k2}^{128} \tag{71}$$

$$s(i) = \begin{cases} d_0 C_{k1}^{128}(i) & \text{if } C_{k1}^{128}(i) + C_{k2}^{128}(i) \equiv 0 \mod 2 \\ d_1 C_{k1}^{128}(i) & \text{otherwise} \end{cases} \tag{72}$$

When the spreading factor is fourfold larger: The codes generated from a code of expression 73 will be considered. In here, it is assumed that code of expressions 74, 75, and 76 are in use.

$$C_0^{16} \tag{73}$$

$$C_0^{128} \tag{74}$$

$$C_1^{128} \tag{75}$$

$$C_7^{128} \tag{76}$$

In this case, as show in FIG. 8, it is impossible to generate signals of the spreading factor 32 when the codes are not reassigned in the tree-structured generation method.

Then, a method for performing 32-fold spreading by combining four codes corresponding to the 128-fold spreading factor will be shown as follows. When the spreading factor is twofold larger, optional combinations can be realized. However, there is a limitation to the combined codes when combining four codes.

It is a limitation that there is one sequence containing all zeroes when an addition of modulo 2 is executed per bits of four codes. In this case, if the additions of modulo 2 are executed to code of expressions 77, 78, 79 and 80 per bits, the obtained sequence contains all zeroes.

$$C_2^{128} \tag{77}$$

$$C_3^{128} \tag{78}$$

$$C_4^{128} \tag{79}$$

$$C_5^{128} \tag{80}$$

That is, it is possible to combine these four codes together. Therefore, it is also possible to generate signals of the spreading factor 32 by using four code sequences given by:

$$\begin{aligned}
C_2^{128} &= C_0^{16},\ C_0^{16},\ \overline{C_0^{16}},\ \overline{C_0^{16}},\ C_0^{16},\ C_0^{16},\ \overline{C_0^{16}},\ \overline{C_0^{16}} \\
C_3^{128} &= C_0^{16},\ C_0^{16},\ \overline{C_0^{16}},\ \overline{C_0^{16}},\ \overline{C_0^{16}},\ \overline{C_0^{16}},\ C_0^{16},\ C_0^{16} \\
C_4^{128} &= C_0^{16},\ \overline{C_0^{16}},\ C_0^{16},\ \overline{C_0^{16}},\ C_0^{16},\ \overline{C_0^{16}},\ C_0^{16},\ \overline{C_0^{16}} \\
C_5^{128} &= C_0^{16},\ \overline{C_0^{16}},\ C_0^{16},\ \overline{C_0^{16}},\ \overline{C_0^{16}},\ C_0^{16},\ \overline{C_0^{16}},\ C_0^{16}
\end{aligned} \tag{81}$$

These codes can be considered by dividing to the parts of the four bit pairs of (1, 4), (2, 3), (5, 8), and (6, 7). If data is allocated to each pair of (1, 4), (2, 3), (5, 8) and (6, 7) similarly to make the codes structured by the tree-structured spreading code generation method, except the direct orthogonal codes, the generated signals become orthogonal to code of expressions 82, 83, 84 and 85. Therefore, the signals of the spreading factor 32 can be accumulated.

$$C_0^{128} \tag{82}$$

$$C_1^{128} \tag{83}$$

$$C_6^{128} \tag{84}$$

$$C_7^{128} \tag{85}$$

The above-described principle can be expressed in the following general formation. In order to be 32-fold spreading, four symbols transmission should be performed by employing a sequence having the length 128. The data symbols are expressed as d1, d2, d3 and d4. The generated signal is shown by s(i).

(STEP 1): It is judged whether or not the four or more code of expressions 86 are idle.

$$C_k^{128} \tag{86}$$

When four or more codes of expression 86 are idle, the processing proceeds to the next step 2.

When four or more codes of expression 86 are not idle, the processing is finished because the code of expression can not be assigned.

(STEP 2): It is judged whether or not the usable sets of code of expressions 87, 88, 89 and 90 coexist.

$$C_{4k}^{128} \tag{87}$$

$$C_{4k+1}^{128} \tag{88}$$

$$C_{4k+2}^{128} \tag{89}$$

$$C_{4k+3}^{128} \tag{90}$$

When there is no set of the codes of expression 87, 88, 89 and 90, a code of expression 91 is employed.

$$C_k^{32} \tag{91}$$

That is, the signal S(i) it is expressed as:

$$s(i) = \begin{cases} d_0 C_k^{32}(i) & 0 \le i < 32 \\ d_1 C_k^{32}(i-32) & 32 \le i < 64 \\ d_2 C_k^{32}(i-64) & 64 \le i < 96 \\ d_3 C_k^{32}(i-96) & 96 \le i < 128 \end{cases} \tag{92}$$

If the usable sets of the codes of expression 87, 88, 89 and 90 do not coexist, the processing proceeds to the next step 3.

(STEP 3): Then, it is judged whether or not combinations such that the values obtained by the additions of modulo 2 per bits of four sequences are all zeroes exist.

When the combinations can be obtained, the sequences become codes of expression 93, 94, 95 and 96. Then, the processing proceeds to the next step 4. These codes are given by:

$$C_{k0}^{128} \tag{93}$$

$$C_{k1}^{128} \tag{94}$$

$$C_{k2}^{128} \tag{95}$$

$$C_{k3}^{128} \tag{96}$$

When there is no combination, the processing is finished because the codes can not be assigned.

(STEP 4): d0 to d3 are modulated with the above-described codes of expression 93, 94, 95 and 96. The modulated signal S(i) can be expressed as:

$$s(i) = \begin{cases} d_0 C_{k0}^{128}(i) & \text{if } C_{k0}^{128}(i) + C_{k1}^{128}(i) + C_2^{128}(i) + C_3^{128} \equiv 0 \bmod 4 \\ d_1 C_{k0}^{128}(i) & \text{else if } C_{k0}^{128}(i) = C_{k1}^{128}(i) \\ d_2 C_{k0}^{128}(i) & \text{else if } C_{k0}^{128}(i) = C_{k2}^{128}(i) \\ d_3 C_{k0}^{128}(i) & \text{otherwise} \end{cases} \tag{97}$$

Next, a procedure of code assignment method using this principle will be explained similar to the first and second code assignment methods. 1When the supported spreading factors are 16, 32, 64 and 128, and the codes generated in the tree-structured generation method of the spreading codes are employed, the code assignment will be explained as follows. The codes generated by the first and second code structure methods can be also employed.

It is a different feature to make the code assignment possible by reassigning the codes to be in use even if the code assignment can not be executed by the first spreading code assignment method.

When the required spreading factor is 128, the procedures of the steps are the same as that of the first spreading code assignment method.

When the required spreading factor is 64:

(STEP 1): where k is zero.

(STEP 2): Then, it is judged whether or not a code of expression 98 is usable and a code of expression 99 is unusable.

$$C_{2k}^{64} \tag{98}$$

$$C_{2k+1}^{64} \tag{99}$$

When the code of expression 98 is usable and the code of expression 99 is unusable, the step is finished by assigning the code of expression 98.

When the code of expression 98 is not usable and the code of expression 99 is usable, the next step 3 is executed.

(STEP 3): It is judged whether or not the code of expression 98 is unusable and the code of expression 99 is usable.

When the code of expression 98 is unusable and the code of expression 99 is usable, the procedure is finished by assigning the code of expression 99.

When the code of expression 98 is usable and the code of expression 99 is not usable, the processing proceeds to the next step 4.

(STEP 4): If k is 31, this procedure proceeds to the next step 5.

If k is not 31, k is set as k+1. Then, the processing is returned to the step 2 to repeat the processing.

(STEP 5): k is set as zero.

(STEP 6): Then, it is judged whether or not a code of expression 100 is usable.

$$C_k^{64} \tag{100}$$

When the code of expression 100 is usable, the processing is finished by assigning the code of expression 100 as a code.

When the code of expression 100 is not usable, the procedure proceeds to the next step 7.

(STEP 7): If k is 63, the procedure proceeds to the next step 8.

If k is not 63, k is set as k+1. Then, the processing is returned to the step 9 to repeat the processing.

(STEP 8): k and u are respectively set as zero.

(STEP 9): Then, it is judged whether or not a code of expression 101 is usable.

$$C_k^{128} \tag{101}$$

When the code of expression 101 is usable, m[u] is set as k, and u is set as u+1.

If u is 2, this processing proceeds to the step 11.

If u is not 2, this processing proceeds to the next step 10.

When the code of expression 101 is not usable, the processing goes to the next step 10.

(STEP 10): If k is 127, the processing is finished because the code can not be assigned.

If k is not 127, k is set as k+1. Then, the processing is returned to the step 9 to repeat the processing. Data of two symbols is modulated by the use of the pair of the following code of expressions 102 and 103.

$$C_{m[0]}^{128} \quad (102)$$

$$C_{m[1]}^{128} \quad (103)$$

If the data of two symbols are expressed as d0 and d1, the generated signal s(i) is expressed as follows;

$$s(i) = \begin{cases} d_0 C_{m[0]}^{128}(i) & \text{if } C_{m[0]}^{128}(i) + C_{m[1]}^{128}(i) \equiv 0 \bmod 2 \\ d_0 C_{m[0]}^{128}(i) & \text{otherwise} \end{cases} \quad (104)$$

When the requested spreading factor is 32:
(STEP 1): where k is set as zero.
(STEP 2): Then, it is judged whether or not a code of expression 105 is usable and a code of expression 106 is unusable.

$$C_{2k}^{32} \quad (105)$$

$$C_{2k+1}^{32} \quad (106)$$

When the code of expression 105 is usable and the code of expression 106 is unusable, the processing is finished by assigning the code of expression 105.

When the code of expression 105 is not usable and the code of expression 106 is usable, the processing proceeds to the next step 3.

(STEP 3): Then, it is judged whether or not the code of expression 105 is unusable and the code of expression 106 is usable.

When the code of expression 105 is unusable and the code of expression 106 is usable, the processing is finished by assigning the code of expression 106 as a code.

When the code of expression 105 is usable and the code of expression 106 is not usable, the processing proceeds to the next step 5.

(STEP 4): If k is 15, the processing proceeds to the next step 5.

If k is not 15, k is set as k+1. Then, the processing is returned to the step 2 to repeat the processing.

(STEP 5): k is set as zero.
(STEP 6): Then, it is judged whether or not a code of expression 107 is usable.

$$C_k^{32} \quad (107)$$

When the code of expression 107 is usable, this processing is finished by assigning the code of expression 107.

When the code of expression 107 is not usable, the procedure proceeds to the next step 7.

(STEP 7): If k is 31, the procedure proceeds to the next step 8.

If k is not 31, k is set as k+1. Then, the processing is returned to the step 6 to repeat the above-described steps.

(STEP 8): k and u are respectively set as zero.
(STEP 9): It is judged whether or not a code of expression 108 is usable.

$$C_k^{64} \quad (108)$$

When the code of expression 108 is usable, m[u] is set as k, and u is set as u+1.

If u is 2, the procedure is passed to a step 11.
If u is not 2, the procedure proceeds to the next step 10.
When the code of expression 108 is not usable, the processing proceeds to the next step 10.

(STEP 10): If k is 63, the processing is passed to the step 12.

If k is not 63, k is set as k+1. Then, the processing is returned to the step 9 to repeat the above-described steps.

(STEP 11): Data of two symbols is modulated by employing a combination of code of expressions 109 and 110.

$$C_{m[0]}^{64} \quad (109)$$

$$C_{m[1]}^{64} \quad (110)$$

When expressing the data of two symbols as d0 and d1, the generated signal s(i) can be expressed as:

$$s(i) = \begin{cases} d_0 C_{m[0]}^{128}(i) & \text{if } C_{m[0]}^{64}(i) + C_{m[1]}^{128}(i) \equiv 0 \bmod 2 \\ d_1 C_{m[0]}^{64}(i) & \text{otherwise} \end{cases} \quad (111)$$

(STEP 12): k and u are respectively set as zero.
(STEP 13): Then, it is judged whether or not a code of expression 112 is usable.

$$C_k^{128} \quad (112)$$

When the code of expression 112 is usable, m[u] is set as k, and u is set as u+1.

Here, if u is 3, the procedure is passed to a step 15.
If u is not 3, the processing proceeds to the next step 14.
When the code of expression 112 is not usable, the processing proceeds to the next step 14.

(STEP 14): If k is 127, it is judged whether or not u is 2.
If u is set as 2, m[0] is set as m[1], and u is set as one. Further, k is set as m[]+1. Then, the processing proceeds to a step 15.

If u is not 2, the processing is finished because the code of expression 112 is not assigned.

If k is not 127, k is set as k+1, the processing is passed to a step 15.

(STEP 15): Then, it is judged whether or not a code of expression 114 given by a code of expression 113 is usable.

$$C_{m[3]}^{128} = C_{m[0]}^{128}(i) + C_{m[1]}^{128}(i) + C_{m[2]}^{128}(i) \quad (113)$$

$$C_{m[3]}^{128} \quad (114)$$

When the code of expression 114 given by the code of expression 113 is usable, the procedure proceeds to the next step 16.

When the code of expression 114 is not usable, u is set as u−1. Then, the processing is returned to the step 14 to repeat the processing.

(STEP 16): d1 to d3 are modulated by the use of a code of expression 115. In here, a relationship shown by the following equation 116 can be obtained.

$$C^{128}_{m[0]}, C^{128}_{m[1]}, C^{128}_{m[2]}, C^{128}_{m[3]} \quad (115)$$

$$s(i) = \begin{cases} d_0 C^{128}_{m[0]}(i) & \text{if } C^{128}_{m[0]}(i) + C^{128}_{m[1]}(i) + C^{128}_{m[2]}(i) + C^{128}_{m[3]}(i) \equiv 0 \bmod 4 \\ d_1 C^{128}_{m[0]}(i) & \text{else if } C^{128}_{m[0]}(i) = C^{128}_{m[1]}(i) \\ d_2 C^{128}_{m[0]}(i) & \text{else if } C^{128}_{m[0]}(i) = C^{128}_{m[2]}(i) \\ d_3 C^{128}_{m[0]}(i) & \text{otherwise} \end{cases} \quad (116)$$

When the requested spreading factor is 16:
(STEP 1): where k is set as zero.
(STEP 2): Then, it is judged whether or not a code of expression 117 is usable or not.

$$C^{16}_k \quad (117)$$

When the code of expression 117 is usable, the processing is finished by assigning the code.
When the code of expression 117 is not usable, the processing proceeds to the next step 3.
(STEP 3): If k is 15, the processing proceeds to the next step 4.
If k is not 15, k is set as k+1. Then, the processing is returned to the step 2.
(STEP 4): k and u are set as zero.
(STEP 5): Then, it is judged whether or not a code of expression 118 is usable.

$$C^{32}_k \quad (118)$$

If the code of expression 118 is usable, mn[u] is set as k and u is set as u+1.
If u is 2, the procedure is passed to a step 7.
If u is not 2, the processing proceeds to the next step 6.
(STEP 6): If k is 31, the procedure is jumped to the step 8.
If k is not 31, k is k+1. Then, the procedure is returned to the step 5 to repeat the processing.
(STEP 7): Data of two symbols is modulated by employing a set of code of expressions 119 and 120. These codes of expression are given by:

$$C^{32}_{m[0]} \quad (119)$$

$$C^{32}_{m[1]} \quad (120)$$

When expressing the data of the two symbols, the generated signal s(i) can be expressed as follows;

$$s(i) = \begin{cases} d_0 C^{32}_{m[0]}(i) & \text{if } C^{32}_{m[0]}(i) + C^{32}_{m[1]}(i) \equiv 0 \bmod 2 \\ d_1 C^{32}_{m[0]}(i) & \text{otherwise} \end{cases} \quad (121)$$

(STEP 8): k and u are respectively set as zero.
(STEP 9): Then, it is judged whether or not a code of expression 122 is usable.

$$C^{64}_k \quad (122)$$

When the code of expression 122 is usable, m[u] is set as k and u is set as u+1.
If u is 3, the procedure is passed to a step 11.

If u is not 3, the processing proceeds to the next step 10.
When the code of expression 122 is not usable, the procedure proceeds to the next step 10.
(STEP 10): If k is 63, it is judged whether or not u is 2.
If u is 2, m[0] is set as m[1], u is set as 1, and k is set as m[0]+1. Then, the processing is returned to the step 9.
If u is not 2, the processing is finished because the code of expression 122 can not assigned as a code.
If k is not 63, k is set as k+1. Then, the processing is returned to the step 9.
(STEP 11): Then, it is judged whether or not a code of expression 124 obtained by a code of expression 123 is usable. Provided that + means an addition of modulo 2.

$$C^{64}_{m[3]}(i) = C^{64}_{m[0]}(i) + C^{64}_{m[1]}(i) + C^{64}_{m[2]}(i) \quad (123)$$

$$C^{64}_{m[3]} \quad (124)$$

When the code of expression 124 is usable, the processing proceeds to the next step 12.
When the code of expression 124 is not usable, u is set as u−1. Then, the processing is returned to the step 10 to repeat the processing.
(STEP 12): d0 to d3 are modulated by the use of a code of expression 125. That is, a relationship can be expressed as a standard equation given by the following signal of expression 126;

$$C^{64}_{m[0]}, C^{164}_{m[1]}, C^{64}_{m[2]}, C^{64}_{m[3]} \quad (125)$$

$$s(i) = \begin{cases} d_0 C^{64}_{m[0]}(i) & \text{if } C^{64}_{m[0]}(i) + C^{64}_{m[1]}(i) + C^{64}_{m[2]}(i) + C^{64}_{m[3]} \equiv 0 \bmod 4 \\ d_1 C^{64}_{m[0]}(i) & \text{else if } C^{64}_{m[0]}(i) = C^{64}_{m[1]}(i) \\ d_2 C^{64}_{m[0]}(i) & \text{else if } C^{64}_{m[0]}(i) = C^{64}_{m[2]}(i) \\ d_3 C^{64}_{m[0]}(i) & \text{otherwise} \end{cases} \quad (126)$$

Further, a fourth assignment method of spreading codes according to the present invention will be now explained.
A code assignment where spreading factors supported by the system are 16, 32, 64, and 128 and the code generated by the tree-structured code generation method is used will be explained as one example.
Codes generated in the first and second code structure methods according to the present invention can be also assigned.
The fourth assignment method is different from the above-explained code assignment method of spreading codes in that code assignment can be executed by reassigning codes when only uncombinable codes are usable. Further, it is a feature of the fourth method to require a number of reassigned codes less than that of reassigned codes in the second spreading code assignment method.
When the requested spreading factor is 128, the processing is the same as the first spreading code assignment method.
When the requested spreading factor is 64, the processing is the same as the third spreading code assignment method.
When the requested spreading factor is 32:
(STEP 9): where k is set as zero.
(STEP 2): Then, it is judged whether or not a code of expression 127 is usable and a code of expression 128 is unusable. These codes are given by:

$$C^{32}_{2k} \quad (127)$$

$$C_{2k+1}^{32} \quad (128)$$

When the code of expression 127 is usable and the code of expression 128 is unusable, the processing is finished by assigning the code of expression 127 as a code.

When the code of expression 127 is not usable and the code of expression 128 is usable, the processing proceeds to the next step 3.

(STEP 3): It is judged whether or not the above-described code of expression 127 is unusable and the above-described code of expression 128 is usable.

When the code of expression 127 is unusable and the code of expression 128 is usable, the processing is finished by assigning the code of expression 128.

When the code of expression 127 is usable and the code of expression 128 is not usable, the processing proceeds to the next step 4.

(STEP 4): If k is 15, the processing proceeds to the next step 5.

If k is not 15, k is set as k+1. Then, the processing is returned to the step 2 to repeat the processing.

(STEP 5): k is set as zero.

(STEP 6): Then, it is judged whether or not a code of expression 129 is usable.

$$C_k^{32} \quad (129)$$

When the code of expression 129 is usable, the procedure is finished by assigning the code of expression 129.

When the code of expression 129 is unusable, the processing proceeds to the next step 7.

(STEP 7): If k is 31, the processing proceeds to the step 8.

If k is not 31, k is set as k+1. Then, the processing is returned to the step 6.

(STEP 8): k and u are set as zero.

(STEP 9): It is judged whether or not a code of expression 130 is usable.

$$C_k^{64} \quad (130)$$

When the code of expression 130 is usable, m[u] is set as k, and u is set as u+1.

If u is 2, the procedure is passed to a step 11.

If u is not 2, the processing proceeds to the next step 10.

When the code of expression 130 is not usable, the processing proceeds to the next step 10.

(STEP 10): If k is 63, the procedure is jumped to the step 12.

If k is not 63, k is set as k+1. Then, the processing is returned to the step 9.

(STEP 11): Data of two symbols are modulated by the use of a pair of codes of expression 131 and 132. These codes are given by:

$$C_{m[0]}^{64} \quad (131)$$

$$C_{m[1]}^{64} \quad (132)$$

When expressing the data of the two symbols as d0 and d1, the generated signal s(i) is expressed as follows;

$$s(i) = \begin{cases} d_0 C_{m[0]}^{64}(i) & \text{if } C_{m[0]}^{64}(i) + C_{m[1]}^{64}(i) \equiv 0 \bmod 2 \\ d_1 C_{m[0]}^{64}(i) & \text{otherwise} \end{cases} \quad (133)$$

(STEP 12): where k and u are respectively set as zero.

(STEP 13): It is judged whether or not a code of expression 134 is usable.

$$C_k^{128} \quad (134)$$

When the code of expression 134 is usable, m[u] is set as k and u is set as u+1.

If u is 3, the processing is passed to the step 15.

If u is not 3, the procedure proceeds to the next step 14.

When the code of expression 134 is not usable, the processing proceeds to the next step 14.

(STEP 14): If k is 127, it is judged whether or not u is 2.

If u is 2, the processing is returned to the step 13.

If u is not 2, the processing is passed to the step 17.

If k is not 127, k is set as k+1. Then, the processing is returned to the step 13.

(STEP 15): It is judged whether or not a code of expression 136 given by an equation 135 is usable. Where +2 means an addition of modulo 2.

$$C_{m[3]}^{128} = C_{m[0]}^{128}(i) + C_{m[1]}^{128}(i) + C_{m[2]}^{64}(i) \quad (135)$$

$$C_{m[3]}^{128} \quad (136)$$

When the code of expression 136 is usable, the processing proceeds to the next step 16.

When the code of expression 136 is not usable, the processing is returned to the step 14.

(STEP 16): d0 to d3 are modulated by employing the following code of expression 137.

$$C_{m[0]}^{128}, C_{m[1]}^{128}, C_{m[2]}^{128}, C_{m[3]}^{128} \quad (137)$$

The generated signal s(i) can be expressed as:

$$s(i) = \begin{cases} d_0 C_{m[0]}^{128}(i) & \text{if } C_{m[0]}^{128}(i) + C_{m[1]}^{128}(i) + C_{m[2]}^{128}(i) + C_{m[3]}^{128} \equiv 0 \bmod 4 \\ d_1 C_{m[0]}^{128}(i) & \text{else if } C_{m[0]}^{128}(i) = C_{m[1]}^{128}(i) \\ d_2 C_{m[0]}^{128}(i) & \text{else if } C_{m[0]}^{128}(i) = C_{m[2]}^{128}(i) \\ d_3 C_{m[0]}^{128}(i) & \text{otherwise} \end{cases} \quad (138)$$

(STEP 17): where k and u are respectively set as zero.

(STEP 18): It is judged whether or not a code of expression 139 is usable.

$$C_k^{128} \quad (139)$$

When the code of expression 139 is usable, m[u] is set as k and u is set as u+1.

If u is 3, the processing is passed to a step 20.

If u is not 3, the procedure proceeds to the next step 19.

When the code of expression 139 is usable, the procedure proceeds to the next step 19.

(STEP 19): If k is 127, the processing is finished because the code of expression 139 can not be assigned as a code.

If k is not 127, k is set as k+1. The procedure is returned to the step 18.

(STEP 20): An equation 140 is obtained as follows;

$$C^{128}_{m[3]} = C^{128}_{m[0]}(i) + C^{128}_{m[1]}(i) + C^{128}_{m[2]}(i) \quad (140)$$

(STEP 21): It is judged whether or not a code of expression 141 can be released according to the code reassignment.

$$C^{128}_{m[3]}(i) \quad (141)$$

When the code of expression 141 can be released, codes which makes the code of expression 141 unusable is reassigned. Then, the processing proceeds to the next step 22.

When the code of expression 141 can not be released, u is set as u−1. Then, the processing is returned to the step 19.

(STEP 22): d0 to d3 are modulated by employing a code of expression 142.

$$C^{128}_{m[0]}, C^{128}_{m[1]}, C^{128}_{m[2]}, C^{128}_{m[3]} \quad (142)$$

This modulated signal is expressed as follows;

$$s(i) = \begin{cases} d_0 C^{128}_{m[0]}(i) & \text{if } C^{128}_{m[0]}(i) + C^{128}_{m[1]}(i) + C^{128}_{m[2]}(i) + C^{128}_{m[3]} \equiv 0 \bmod 4 \\ d_1 C^{128}_{m[0]}(i) & \text{else if } C^{128}_{m[0]}(i) = C^{128}_{m[1]}(i) \\ d_2 C^{128}_{m[0]}(i) & \text{else if } C^{128}_{m[0]}(i) = C^{128}_{m[2]}(i) \\ d_3 C^{128}_{m[0]}(i) & \text{otherwise} \end{cases} \quad (143)$$

When the required spreading factor is 16:

(STEP 1): where k is set as zero.

(STEP 2): Then, it is judged whether or not a code of expression 144 is usable.

$$C^{16}_k \quad (144)$$

When the code of expression 144 is usable, the processing is finished by assigning the code of expression 144.

When the code of expression 144 is not usable, the procedure proceeds to the next step 3.

(STEP 3): If k is 15, the processing proceeds to the next step 4.

If k is not 15, k is set as k+1. Then, the procedure is jumped to a step 6.

(STEP 4): k and u are respectively set as zero.

(STEP 5): It is judged whether or not a code of expression 145 is usable.

$$C^{32}_k \quad (145)$$

When the code of expression 145 is usable, m[u] is set as k and u is set as u+1.

If u is 2, the procedure is jumped to a step 7.

If u is not 2, the procedure proceeds to the next step 6.

When the code of expression 145 is not usable, the processing proceeds to the next step 6.

(STEP 6): If k is 31, the procedure is passed to a step 8.

If k is not 31, k is set as k+1. Then, the processing is returned to the step 5.

(STEP 7): Data of two symbols is modulated by the use of a set of code of expressions 146 and 147. These codes are given by:

$$C^{32}_{m[0]} \quad (146)$$

$$C^{132}_{m[1]} \quad (147)$$

When expressing the data of two symbols as d0 and d1, the generated signal s(i) is expressed as follows:

$$s(i) = \begin{cases} d_0 C^{32}_{m[0]}(i) & \text{if } C^{32}_{m[0]}(i) + C^{32}_{m[1]}(i) \equiv 0 \bmod 2 \\ d_1 C^{32}_{m[0]}(i) & \text{otherwise} \end{cases} \quad (148)$$

(STEP 8): where k and u are respectively set as zero.

(STEP 9): It is judged whether or not a code of expression 149 is usable.

$$C^{64}_k \quad (149)$$

When the code of expression 149 is usable, m[u] is set as k, and u is set as u+1.

If u is 3, the processing is jumped to a step 11.

If u is not 3, the processing proceeds to the next step 10.

When the code of expression 149 is not usable, the procedure proceeds to the next step 10.

(STEP 10): If k is 63, the processing is passed to a step 13.

If k is not 63, k is set as k+1. Then, the processing is returned to the step 9 to repeat the processing.

(STEP 11): It is judged whether or not a code of expression 151 obtained by an equation 150 is usable. Provided that + means an addition of modulo 2.

$$C^{64}_{m[3]} = C^{64}_{m[0]}(i) + C^{64}_{m[1]}(i) + C^{64}_{m[2]}(i) \quad (150)$$

$$C^{64}_{m[3]} \quad (151)$$

When the code of expression 151 is usable, the processing proceeds to the next step 12.

When the code of expression 151 is not usable, u is set as u−1. Then, the processing is returned to the step 10.

(STEP 12): d1 to d3 are modulated by the use of the following code of expression 152:

$$C^{64}_{m[0]}, C^{64}_{m[1]}, C^{64}_{m[2]}, C^{64}_{m[3]} \quad (152)$$

That is, this modulated signal can be expressed as:

$$s(i) = \begin{cases} d_0 C^{64}_{m[0]}(i) & \text{if } C^{64}_{m[0]}(i) + C^{64}_{m[1]}(i) + C^{64}_{m[2]}(i) + C^{64}_{m[3]} \equiv 0 \bmod 4 \\ d_1 C^{64}_{m[0]}(i) & \text{else if } C^{64}_{m[0]}(i) = C^{64}_{m[1]}(i) \\ d_2 C^{64}_{m[0]}(i) & \text{else if } C^{64}_{m[0]}(i) = C^{64}_{m[2]}(i) \\ d_3 C^{64}_{m[0]}(i) & \text{otherwise} \end{cases} \quad (153)$$

(STEP 13): where k and u are respectively set as zero.

(STEP 14): Then, it is judged whether or not a code of expression 154 is usable.

$$C^{64}_k \quad (154)$$

When the code of expression 154 is usable, m[u] is set as k and u is set as +1.

If u is 3, the processing is jumped to a step 16.

If u is not 3, the processing proceeds to the next step 15.

When the code of expression 154 is not usable, the processing proceeds to the next step 15.

(STEP 15): If k is 63, the processing is finished because the code of expression 154 can not be assigned.

If k is not 63, k is set as k+1. Then, the processing proceeds to a step 16.

(STEP 16): The following equation 155 is obtained.

$$C^{64}_{m[3]} = C^{64}_{m[0]}(i) + C^{64}_{m[1]}(i) + C^{64}_{m[2]}(i) \tag{155}$$

(STEP 17): It is judged whether or not a code of expression 156 can be released according to the code reassignment.

$$C^{64}_{m[3]}(i) \tag{156}$$

When the code of expression 156 can be released, codes of user who makes the code of expression 156 unusable is reassigned. Then, the processing proceeds to the next step 18.

When the code of expression 156 can not be released, u is set as u−1. Then, the processing is returned to the step 15.

(STEP 18): d0 to d3 are modulated by employing a code of expression 157.

$$C^{64}_{m[0]}, C^{64}_{m[1]}, C^{64}_{m[2]}, C^{64}_{m[4]} \tag{157}$$

That is, this modulated signal can be expressed by:

$$s(i) = \begin{cases} d_0 C^{64}_{m[0]}(i) & \text{if } C^{64}_{m[0]}(i) + C^{64}_{m[1]}(i) + C^{64}_{m[2]}(i) + C^{64}_{m[4]}(i) \equiv 0 \bmod 4 \\ d_1 C^{64}_{m[0]}(i) & \text{else if } C^{64}_{m[0]}(i) = C^{64}_{m[1]}(i) \\ d_2 C^{64}_{m[0]}(i) & \text{else if } C^{64}_{m[0]}(i) = C^{64}_{m[2]}(i) \\ d_3 C^{64}_{m[0]}(i) & \text{otherwise} \end{cases} \tag{158}$$

As explained above, a code structure method for combining long periodical codes, by which auto-correlation properties are improved is provided according to the present invention. Accordingly, a radio communication system for mobile communications using spread spectrum to prevent mutual interference can be presented, even if the data having different transmission rates are concurrently multiplexed on the same frequency band width with different spreading factors.

Further, it becomes possible to prevent mutual interference even on communication paths having delay. Simultaneously, it becomes possible to improve auto-correlation properties of sequences and simplify initial synchronous acquisition properties.

Further, according to the present invention, it becomes possible to effectively assign spreading codes. Thereby makes it easy to cope with the case where the transmission rate required on the backward and forward channels are different, especially, on a multimedia mobile communication system in which different data transmission rates are required.

More particular, in the code allocation proposed in the tree-structured generation method of orthogonal spreading codes in the third technique, only some specific reading codes are inclined to be used when the signals having different spreading factors coexist. Therefore, unusable codes remain in high speed data transmission, as it were a worm-eaten form. Accordingly, it has caused a problem that codes can not be efficiently used.

The present invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for generating code division multiple access data from data having different rates by a direct spread spectrum, said method comprising the steps of:

combining an orthogonal code and a reversed orthogonal code obtained by inverting the orthogonal code, for each of orthogonal code sequences structured by an m-sequence thereby to generate a first sequence of orthogonal codes;

combining two of the orthogonal code for each of orthogonal code sequences structured by the m-sequence thereby to generate a second sequence of orthogonal codes;

combining two of the reversed orthogonal code for each of orthogonal code sequences structured by the m-sequence thereby to generate a third sequence of orthogonal codes; and generating another orthogonal code having twice a code length of the orthogonal code from the first, second and third sequence of orthogonal codes; and multiplying the generated orthogonal code and a different m-sequence, together.

2. A method for generating code division multiple access data from data having different rates by a direct spread spectrum, said method comprising the steps of:

combining an orthogonal code and a reversed orthogonal code obtained by inverting the orthogonal code, for each of orthogonal code sequences structured by a quadratic residue sequence thereby to generate a first sequence of orthogonal codes;

combining two of the orthogonal code for each of orthogonal code sequences structured by the quadratic residue sequence thereby to generate a second sequence of orthogonal codes;

combining two of the reversed orthogonal code for each of orthogonal code sequences structured by the quadratic residue sequence thereby to generate a third sequence of orthogonal codes; and generating another orthogonal code having twice a code length of the orthogonal code from the first, second and third sequence of orthogonal codes; and multiplying the generated orthogonal code and a different quadratic residue sequence, together.

3. The method for spreading spectrum of data according to claims 1, wherein said step of generating another orthogonal code having twice a code length of the orthogonal code from the first, second and third sequence of orthogonal codes is repeated for a plurality of times.

4. The method for spreading spectrum of data according to claim 1, wherein said generated code division multiple access data has tree-structured code, and further comprising the steps of:

finding a pair of codes derived from a certain code having a spreading factor, the pair of codes having twice the spreading factor of the certain code and only one code of the pair by used; and allocating the other code of the pair, which is unused to the code division multiple access data.

5. The method for spreading spectrum of data according to claim 2, wherein said generated code division multiple access data has tree-structured codes, and further comprising the steps of:

finding a pair of codes derived from a certain code having a spreading factor, the pair of codes having twice the spreading factor of the certain code and only one code of the pair being used; and allocating preferentially the other code of the pair, which is unused to the code division multiple access data.

6. A method for generating code division multiple access data from data having different rates by a direct spread spectrum, said method comprising the steps of:

finding a pair of codes derived from a certain code within tree-structured codes generated from an orthogonal code sequence, the pair of codes having twice a spreading factor of the certain code and only one code of the pair being used; and allocating preferentially the other code of the pair, which is unused to the code division multiple access data.

7. The method for spreading spectrum of data according to claim 6, further comprising the steps of:

replacing one used code of one of the two pairs with one unused code of the other of the two pairs thereby perform reallocation of codes.

8. The method for spreading spectrum of data according to claim 1, wherein said generated code division multiple access data has tree-structured codes, and further comprising the steps of:

performing addition of modulo 2 for each corresponding bits of two code sequences, each having one spreading factor; and modulating two digital symbols of digital signals respectively on positions of values 0 and 1 obtained by the step of performing addition of modulo 2 thereby that the digital signal may be transmitted with one half of the one spreading factor.

9. The method for spreading spectrum of data according to claim 2, wherein said generated code division multiple access data has tree-structured codes, and further comprising the steps of:

performing addition of modulo 2 for each corresponding bits of two code sequences, each having one spreading factor; and modulating two digital symbols of digital signals respectively on positions of values 0 and 1 obtained by the step of performing addition of modulo 2 thereby that the digital signal may be transmitted with one half of the one spreading factor.

10. A method for generating code division multiple access data having tree-structured codes from data having different rates by a direct spread spectrum, said method comprising the steps of:

generating the tree-structured codes by a Walsh sequence;

performing addition of modulo 2 for each corresponding bits of two code sequences, each having one spreading factor; and modulating two digital symbols of digital signals respectively on positions of values 0 and 1 obtained by the step of performing addition of modulo 2 thereby that the digital signals may be transmitted with one half of the one spreading factor.

11. A method for generating code division multiple access data having tree-structured codes by from data having different rates by a direct spread spectrum, said method comprising the steps of:

generating the tree-structured codes by orthogonal Gold codes;

performing addition of modulo 2 for each corresponding bits of two code sequences, each having one spreading factor; and modulating two digital symbols of digital signals respectively on positions of values 0 and 1 obtained by the step of performing addition of modulo 2 thereby that the digital signals may be transmitted with one half of the one spreading factor.

12. The method for spreading spectrum of data according to claim 1, wherein said generated code division multiple access data has tree-structured codes, and further comprising the steps of:

performing addition of modulo 2 for each of the tree-structured codes to find four code sequences of one spreading factor, all of which are zero value; and modulating four digital symbols of digital signals on four respective position for each two bits which are in orthogonal relation thereby that the digital signal may be transmitted with one fourth of the one spreading factor.

13. The method for spreading spectrum of data according to claim 2, wherein said generated code division multiple access data has tree-structured codes, and further comprising the steps of:

performing addition of modulo 2 for each of the tree-structured codes to find four code sequences of one spreading factor, all of which are zero value; and modulating four digital symbols of digital signals on four respective position for each two bits which are in orthogonal relation thereby that the digital signal may be transmitted with one fourth of the one spreading factor.

14. A method for generating code division multiple access data having tree-structured codes by from data having different rates by a direct spread spectrum, said method comprising the steps of:

generating the tree-structured codes by a Walsh sequence;

performing addition of modulo 2 for each of the tree-structured codes to find four code sequences of one spreading factor, all of which are zero value; and modulating four digital symbols of digital signals on four respective position for each two bits which are in orthogonal relation thereby that the digital signal may be transmitted with one fourth of the one spreading factor.

15. A method for generating code division multiple access data having tree-structured codes by from data having different rates by a direct spread spectrum, said method comprising the steps of:

generating the tree-structured codes by orthogonal Gold codes;

performing addition of modulo 2 for each of the tree-structured codes to find four code sequences of one spreading factor, all of which are zero value; and modulating four digital symbols of digital signals on four respective position for each two bits which are in orthogonal relation thereby that the digital signal may be transmitted with one fourth of the one spreading factor.

16. The method for spreading spectrum of data according to claim 12, wherein there are further comprised of the steps of finding releasable codes if said four code sequences of one spreading factor do not satisfy all codes are zero value in the step of performing addition of modulo 2, and replacing said four code sequence of one spreading factor with the releasable codes.

17. The method for spreading spectrum of data according to claim 13, wherein there are further comprised of the steps of finding releasable codes if said four code sequences of one spreading factor do not satisfy all codes are zero value in the step of performing addition of modulo 2, and replacing said four code sequence of one spreading factor with the releasable codes.

18. The method for spreading spectrum of data according to claim 14, wherein there are further comprised of the steps of finding releasable codes if said four code sequences of one spreading factor do not satisfy all codes are zero value in the step of performing addition of modulo 2, and replacing said four code sequence of one spreading factor with the releasable codes.

19. The method for spreading spectrum of data according to claim 15, wherein there are further comprised of the steps of finding releasable codes if said four code sequences of one spreading factor do not satisfy all codes are zero value in the step of performing addition of modulo 2, and replacing said four code sequence of one spreading factor with the releasable codes.

* * * * *